United States Patent
Yoshida

(10) Patent No.: US 9,479,729 B2
(45) Date of Patent: Oct. 25, 2016

(54) INFORMATION PROCESSING APPARATUS, INFORMATION PROCESSING METHOD, COMMUNICATION TERMINAL, AND COMMUNICATION SYSTEM

(71) Applicant: Kumiko Yoshida, Tokyo (JP)

(72) Inventor: Kumiko Yoshida, Tokyo (JP)

(73) Assignee: Ricoh Company, Ltd., Tokyo (JP)

(*) Notice: Subject to any disclaimer, the term of this patent is extended or adjusted under 35 U.S.C. 154(b) by 107 days.

(21) Appl. No.: 14/318,908

(22) Filed: Jun. 30, 2014

(65) Prior Publication Data
US 2015/0002612 A1   Jan. 1, 2015

(30) Foreign Application Priority Data
Jul. 1, 2013   (JP) ................. 2013-138307

(51) Int. Cl.
H04N 7/14 (2006.01)
H04N 7/15 (2006.01)
H04L 29/06 (2006.01)

(52) U.S. Cl.
CPC ............ *H04N 7/15* (2013.01); *H04L 65/1089* (2013.01); *H04L 65/403* (2013.01); *H04N 7/147* (2013.01)

(58) Field of Classification Search
USPC ........... 348/14.1, 14.08, 161, 14.01, 130, 348/231.3, 222.1, 333.11, 14.07, 231.2, 348/E7.063, E3.022, E7.06
See application file for complete search history.

(56) References Cited

U.S. PATENT DOCUMENTS

2004/0117445 A9*  6/2004  Lee ............. G06Q 10/10
                                         709/205
2013/0038676 A1   2/2013  Tanaka et al.

FOREIGN PATENT DOCUMENTS

| JP | 2001-331431 | 11/2001 |
| JP | 2001-331614 | 11/2001 |
| JP | 2004-005345 | 1/2004 |
| JP | 2006-146415 | 6/2006 |
| JP | 2011-254453 | 12/2011 |
| JP | 2012-234237 | 11/2012 |
| JP | 20110100394 | * 11/2012 |

* cited by examiner

*Primary Examiner* — Yosef K Laekemariam
(74) *Attorney, Agent, or Firm* — Oblon, McClelland, Maier & Neustadt, L.L.P.

(57) ABSTRACT

An information processing apparatus is disclosed, which is communicatively connected to a communication terminal, and which is accessible to an image data storage unit and a document data storage unit. The information processing apparatus further includes a receiving unit; and a transmitting unit which, when a transmission request is received by the receiving unit, transmits, to the communication terminal, screen data in which are associated identification information of image data when owner identification information linked to document data stored in the document data storage unit is linked to the image data stored in the image data storage unit or information indicating non-registration when owner identification information linked to the document data stored in the document data storage unit is not linked to the image data stored in the image data storage unit, and identification information of the document data stored in the document data storage unit.

11 Claims, 32 Drawing Sheets

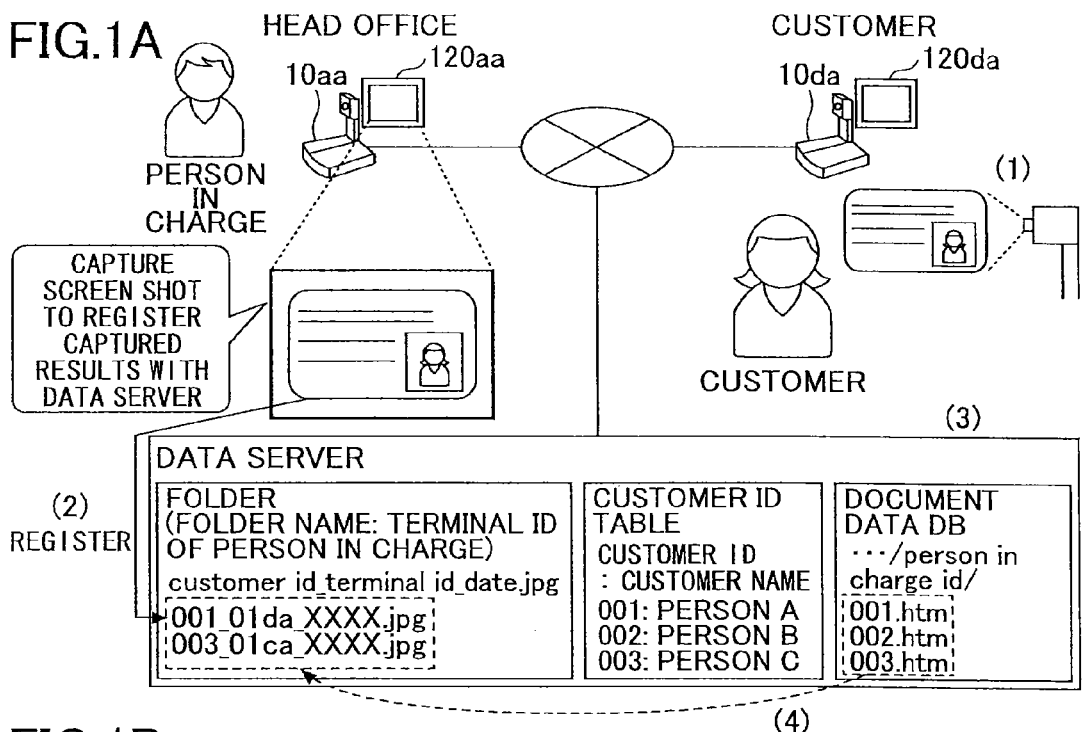
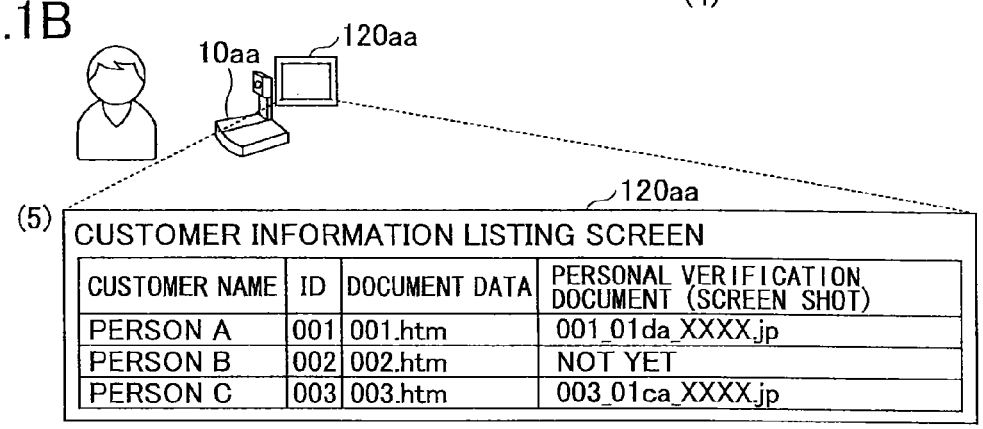
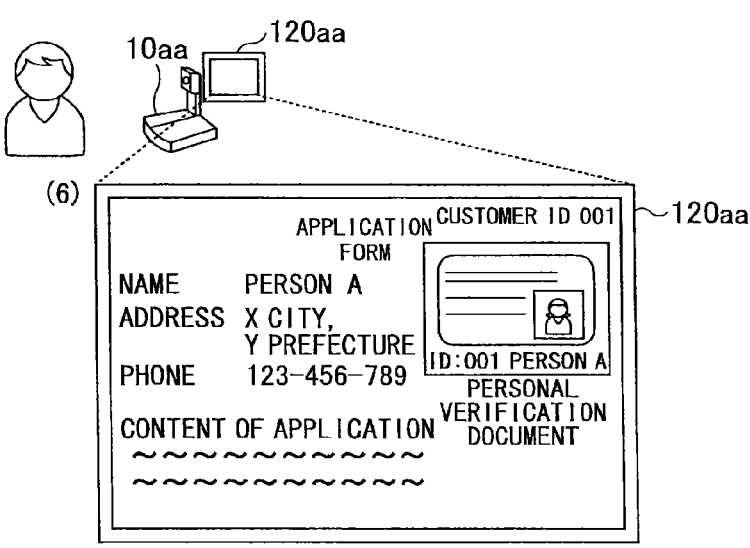

FIG.8

| TERMINAL ID | TYPE | TERMINAL NAME | OPERATING STATUS | IP ADDRESS |
|---|---|---|---|---|
| 02aa | PRINTING TERMINAL | JAPAN TOKYO OFFICE TERMINAL AC | OFFLINE | 1.2.1.5 |
| 02da | PRINTING TERMINAL | US WASHINGTON D.C. TERMINAL DC | ON-LINE | 1.3.2.5 |

FIG.9

RELAY APPARATUS MANAGEMENT TABLE

| RELAY APPARATUS ID | OPERATING STATUS | RECEIVED DATE/TIME | IP ADDRESS OF RELAY APPARATUS | MAXIMUM DATA TRANSMISSION SPEED (Mbps) |
|---|---|---|---|---|
| 111a | ON-LINE | 2013.02.10.13:42 | 1.2.1.2 | 100 |
| 111b | ON-LINE | 2013.02.11.12:05 | 1.2.2.2 | 1000 |
| 111c | OFFLINE | 2013.02.10.17:33 | 1.3.1.2 | 100 |
| 111d | ON-LINE | 2013.02.10.09:02 | 1.3.2.2 | 10 |

FIG.10

TERMINAL AUTHENTICATION MANAGEMENT TABLE

| TERMINAL ID | PASSWORD |
|---|---|
| 01aa | aaaa |
| 01ab | abab |
| 01ac | acac |
| ... | ... |

FIG.11

TERMINAL STATUS MANAGEMENT TABLE

| TERMINAL ID | TYPE | TERMINAL NAME | OPERATING STATUS | RECEIVED DATE/TIME | IP ADDRESS |
|---|---|---|---|---|---|
| 01aa | CALL TERMINAL | Japan Tokyo Office Terminal AA | ON-LINE (CALL POSSIBLE) | 2013.02.10.13:40 | 1.2.1.3 |
| 01ab | CALL TERMINAL | Japan Tokyo Office Terminal AB | ON-LINE (TEMPORARILY SUSPENDED) | 2013.02.11.12:00 | 1.2.1.4 |
| 02aa | PRINTING TERMINAL | Japan Tokyo Office Terminal AC | OFFLINE | 2013.02.09.17:30 | 1.2.1.5 |
| ... | ... | ... | ... | ... | ... |
| 01da | CALL TERMINAL | US Washington D.C. Office Terminal DA | ON-LINE (CALL POSSIBLE) | 2013.12.10.12:41 | 1.3.2.3 |
| 01db | CALL TERMINAL | US Washington D.C. Office Terminal DB | ON-LINE (CALL ONGOING) | 2013.02.10.13:30 | 1.3.2.4 |
| 02da | PRINTING TERMINAL | US Washington D.C. Office Terminal DC | OFFLINE | 2013.02.10.09:00 | 1.3.2.5 |
| ... | ... | ... | ... | ... | ... |

FIG.12

DESTINATION LIST MANAGEMENT TABLE

| REQUESTOR TERMINAL ID | DESTINATION TERMINAL ID |
|---|---|
| 01aa | 01ab,・・・,01ba,01bb,・・・,01ca,01cb,01da,02aa,02da |
| ... | |
| 01ba | 01aa,01ab,01ca,01cb,01da,01db |
| ... | |
| 01ca | 01aa,01ab,01ba,・・・,01da,01ca,・・・,01da |
| ... | |

FIG.13

SESSION MANAGEMENT TABLE

| RELAY APPARATUS ID | REQUESTOR TERMINAL ID | DESTINATION TERMINAL ID | DELAY TIME (ms) | DELAY INFORMATION RECEIVED DATE/TIME |
|---|---|---|---|---|
| 111a | 01aa | 01da | 200 | 2013.02.10.13:50 |
| 111b | 01ba | 01cb | 50 | 2013.02.11.12:05 |
| 111c | 01bb | 01cc | 400 | 2013.02.10.17:35 |
| ... | | | ... | |

FIG.23

VIEWING SYSTEM

PERSON IN CHARGE: XXXX    PERSON IN CHARGE ID: 12345

| CUSTOMER NAME | CUSTOMER ID | DOCUMENT DATA | PERSONAL VERIFICATION DOCUMENT |
|---|---|---|---|
| PERSON A | 001 | 001.htm | 001_01da_XXXX.jpg |
| PERSON B | 002 | 002.htm | NOT YET |
| ... | ... | ... | ... |

IMAGE LINK → 001_01da_XXXX.jpg

DOCUMENT LINK → 002.htm

| PERSON IN CHARGE ID | TERMINAL ID OF USABLE TERMINAL |
|---|---|
| 12345 | 01aa |
| 23456 | 01ab |
| 34567 | 01ac |

INFORMATION PROCESSING APPARATUS, INFORMATION PROCESSING METHOD, COMMUNICATION TERMINAL, AND COMMUNICATION SYSTEM

TECHNICAL FIELD

The present invention relates to a communication terminal which communicates with a different communication terminal via a communication network, an information processing apparatus which is communicatively connected via a communication network, etc.

BACKGROUND ART

A remote conference system is known, wherein users in remote locations transmit and receive image data and voice data with call terminals provided with a camera and a microphone. The respective call terminals display the image data transmitted by the call terminal of the conference counterpart on a display and output voice from a loudspeaker. In this way, users at multiple locations may conduct a conference with remote participants in the same manner as conducting the conference in the same conference room.

Now, the remote conference system may be applied not only to a conference, but to various systems. For example, in membership registration application and post-registration inquiries, the customer can converse with a person in charge as if they were directly facing each other even though the customer and the service provider side are located remotely.

Now, in membership registration, etc., the customer stores a duplicate of a personal verification document on the company side. Using a remote conferencing system makes it possible for a communication terminal on the head office side to capture a duplicate of the personal verification document. Thus, an image of the personal verification document can be transmitted from a call terminal on the customer side to a call terminal on the company side to store the transmitted results on the head office side.

There is a related-art technique to store documents used in a teleconference (see Patent Document 1, for example). Patent Document 1 discloses a network conference system, wherein a proceedings log file is created for each predetermined time period, and data related to presentation content; data used at the time of the presentation; memo data; captured data; and various information are synchronized.

PATENT DOCUMENT

Patent Document 1: JP2001-331614A

DISCLOSURE OF THE INVENTION

In view of the fact that the personal verification document captured on the head office side is pasted to membership registration application documents or at least linked thereto to manage the linked results, an object of the present invention is to provide an information processing apparatus which makes it possible to manage the correspondence between document data and image data for a document including personal verification information.

According to an Embodiment of the present invention, an information processing apparatus is provided which is communicatively connected via a communication network to a communication terminal which communicates with a different communication terminal via the communication network, and which is accessible to an image data storage unit which stores image data of a document including personal verification information linked to owner identification information of an owner of the document including the personal verification information, the personal verification information being imaged by the different communication terminal; and a document data storage unit which stores document data linked to the owner identification information of the owner, the information processing apparatus further including: a receiving unit which receives a transmission request from the communication terminal; and a transmitting unit which, when the transmission request is received by the receiving unit, transmits, to the communication terminal, screen data in which are associated identification information of the image data when owner identification information linked to the document data stored in the document data storage unit is linked to the image data stored in the image data storage unit or information indicating non-registration when the owner identification information linked to the document data stored in the document data storage unit is not linked to the image data stored in the image data storage unit, and identification information of the document data stored in the document data storage unit.

The present invention makes it possible to provide an information processing apparatus which allows managing the correspondence between document data and image data for a document including personal verification information.

BRIEF DESCRIPTION OF THE DRAWINGS

Other objects, features, and advantages of the present invention will become more apparent from the following detailed descriptions when read in conjunction with the accompanying drawings, in which:

FIGS. 1A, 1B, and 1C are exemplary diagrams for schematically explaining a process in which a call terminal according to the present Embodiment registers a personal verification document and links with a customer ID;

FIG. 8 is a diagram illustrating one example of destination list information;

FIG. 9 is a conceptual diagram illustrating a relay apparatus management table;

FIG. 10 is a conceptual diagram illustrating a terminal authentication management table;

FIG. 11 is a conceptual diagram illustrating a terminal state management table;

FIG. 12 is a conceptual diagram illustrating a destination list management table;

FIG. 13 is a conceptual diagram illustrating a session management table;

FIG. 23 is a diagram illustrating an example of a customer information listing screen;

BEST MODE FOR CARRYING OUT THE INVENTION

Embodiment 1

Figure 2:
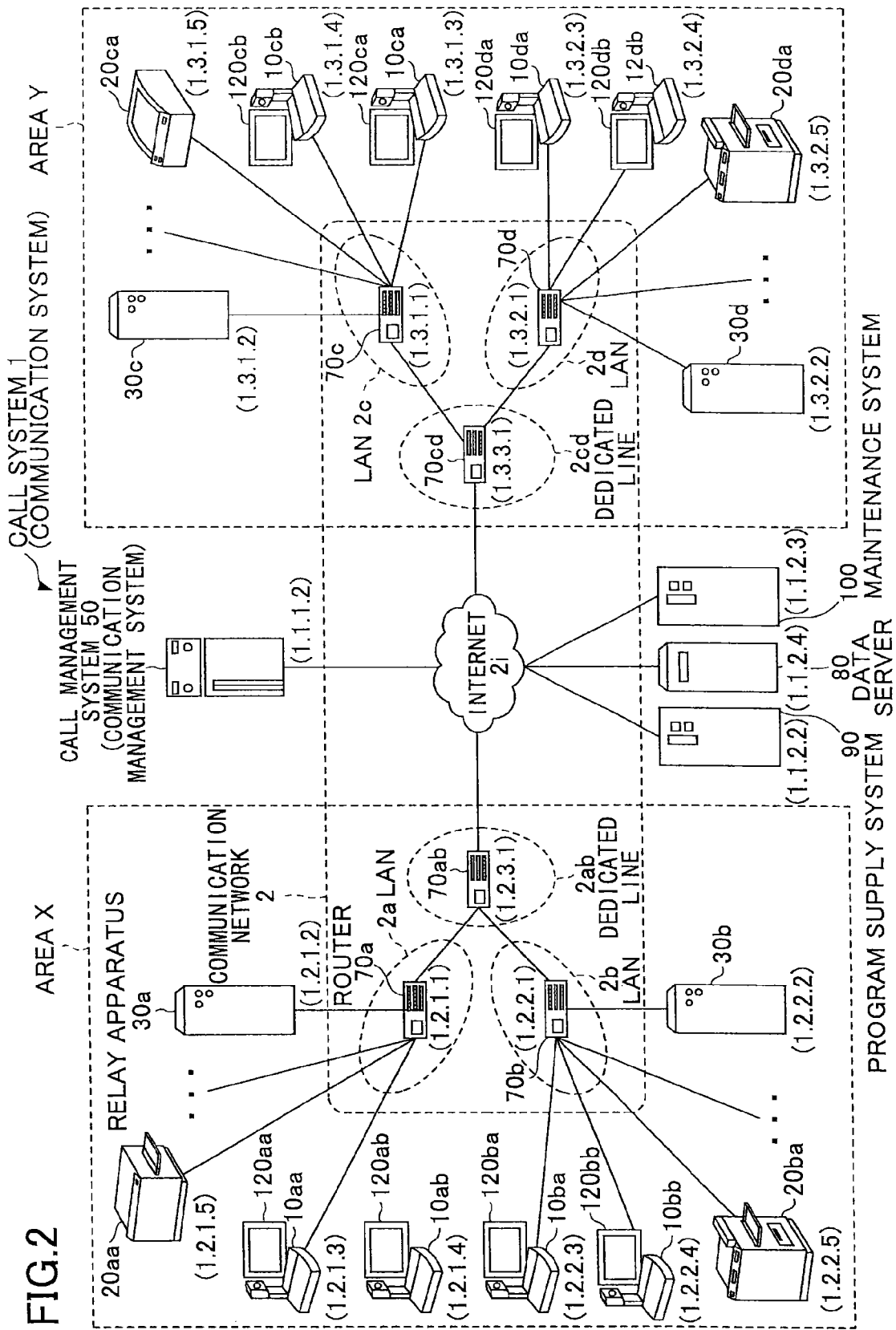
FIG. 2 is a schematic diagram of a call system according to one Embodiment of the present invention.

FIGS. 1A to 1C are exemplary diagrams for schematically explaining a process in which a call terminal according to the present embodiment registers a personal verification document and links the registered results to a customer ID.

A call terminal 10aa is provided on the head office side of a company which provides services to a customer and a call terminal 10da is provided on the branch side or at home (below called the customer side).

The customer holds the personal verification document, which can be imaged with a camera included in the call terminal 10da. Image data of the customer, that are imaged by the call terminal 10da are transmitted to the call terminal 10aa and displayed on a display 120, but cannot be stored by the call terminal 10aa.

(2) When the customer presses a decision button in accordance with an explanation by a person in charge, a capture permission is reported from the call terminal 10da to the call terminal 10aa, which creates a screen shot of a display screen on which the personal verification document is displayed and registers the created results with a data server. The data server manages the screen shot in a folder with a terminal ID of the person in charge as a folder name, and the file name of the screen shot is provided so as to include "a customer ID, a terminal ID (the customer side), and date/time. The customer ID is one example of "owner identification information" in the claims.

(3) Moreover, a customer ID table is built in the data server. The customer ID and the customer name for all customers of the person in charge are registered in association in the customer ID table. However, it is not necessarily the case that screen shots of the personal verification documents for all customers are registered.

Moreover, a document data DB is built in the data server. The document data DB is a DB which stores a document (an application, etc.) related to a customer. In the document data DB, document data including the customer ID in the file name are registered in a folder having a person in charge ID as a folder name.

(4) In order for the person in charge to register the personal verification document by linking it to the document data, or to check whether the personal verification document is complete for each of the customers, the call terminal 10aa accesses the data server. The data server successively reads document data in the document data DB and determines whether a screen shot which includes the customer ID included in the document data as the file name is present in the folder. If the screen shot is present, the data server links the file name of the screen shot and the customer ID, and, if the screen shot is not present, creates screen data linking the customer ID and the fact that the screen shot is not present, and transmits the created screen data to the call terminal 10aa.

(5) In this way, the call terminal 10aa may display a customer information listing screen. As shown in FIG. 1B, persons A and C have screen shots registered in a data server, so that file names of the screen shots are displayed in association on the display 120. On the other hand, person B does not have a screen shot name registered in the data server, "Not yet" is displayed on the display 120. Then, a link to a file is embedded in a file name, while a link to the screen shot name is embedded in the screen shot name.

(6) When the person in charge selects (clicks) the document data, as shown in FIG. 1C, the call terminal 10aa downloads the personal verification document and the document data from the data server, combines the downloaded results, and displays the combined results.

In this way, the call terminal according to the present Embodiment may register document data and a screen shot having the customer ID as metadata with the data server to link the screen shot and the document data. Moreover, the customer for which a screen shot of the personal verification document is not registered may be specified easily.

Overall Configuration of the Embodiment

FIG. 2 is a schematic diagram of a call system according to one Embodiment of the present invention. As shown in FIG. 2, the call system 1 includes multiple call terminals (10aa, 10ab, . . . ); displays (120aa, 120ab, . . . ) for the respective call terminals (10aa, 10ab, . . . ); multiple printing terminals (20a, 20b, 20c, 20d); multiple relay apparatuses (30a, 30b, 30c, 30d); a call management system 50; a program supply system 90; a data server 80; a maintenance system 100; and printing terminals (20aa, 20ba, 20ca, 20da). With this call system 1, communication of image data and voice data as one example of call data may be conducted to implement a teleconference, etc., between remote locations. Multiple routers (70a, 70b, 70c, 70d, 70ab, 70cd) select an optimal route for the call data.

Moreover, the call terminals (10aa, 10ab, . . . ), a printing terminal 20aa, the relay apparatus 30a, and the router 70a are communicatively connected by a LAN 2a. The call terminals (10ba, 10db, . . . ), the printing terminal 20ba, the relay apparatus 30b, and the router 70b are communicatively connected by a LAN 2b. Moreover, the LAN 2a and the LAN 2b are communicatively connected by a dedicated line 2ab which includes the router 70ab. Moreover, the LAN 2a, the LAN 2b, and the dedicated line 2ab are built within a predetermined area X. For example, the area X is Japan, the LAN 2a is built within a Tokyo business office, and the LAN 2b is built within an Osaka business office.

On the other hand, the call terminals (10ca, 10cb, . . . ), the printing terminal 20ca, the relay apparatus 30c, and the router 70c are communicatively connected by the LAN 2c. The call terminals (10da, 10bb, . . . ), the printing terminal 20da, the relay terminal 30d, and the router 70d are communicatively connected by the LAN 2d. Moreover, the LAN 2c and the LAN 2d are communicatively connected by a dedicated line 2cd which includes the router 70cd. Moreover, the LAN 2c, the LAN 2d, and the dedicated line 2cd are built within a predetermined area Y. For example, an area Y is the Unites States, the LAN 2c is built within a New York business office, and the LAN 2d is built within a Washington D.C. business office. The respective areas X and Y are communicatively connected via an Internet 2i from the routers (70ab, 70cd).

Below, an arbitrary call terminal of multiple call terminals (10aa, 10ab, . . . ) is represented as "a call terminal 10"; an arbitrary display of multiple displays (120aa, 120ab, . . . ) is represented as "a display 120"; an arbitrary printing terminal of multiple printing terminals (20aa, 20ba, . . . ) is represented as "a printing terminal 20"; and an arbitrary relay apparatus of multiple relay apparatuses (30a, 30b, . . . ) is represented as "a relay apparatus 30". Moreover, a terminal as a requestor which requests a start of a teleconference is represented as "a requestor terminal", while a terminal as a destination to send a request to (a relay destination) is represented as "a destination terminal". Furthermore, an arbitrary router of routers (70a, 70b, 70c, 70d, 70ab, 70cd) is represented as "a router 70". Moreover, an arbitrary printing terminal of printing terminals (20aa, 20ba, 20ca, . . . ) is represented as "a printing terminal 20".

Moreover, a call management system 50, a program supply system 90, a maintenance system 100, and a data server 80 are connected to the Internet 2i. The call management system 50, the program supply system 90, the maintenance system 100, and the data server 80 may be installed in area X or area Y, or may be installed in other areas.

Moreover, in the present Embodiment, the communication network 2 according to the present Embodiment is built of the LAN 2a, the LAN 2b, the dedicated line 2ab, the Internet 2i, the dedicated line 2cd, the LAN 2c, and the LAN 2d. This communication network 2 may include a location in which communication is conducted not only by wired but also by wireless such as Wi-Fi (Wireless Fidelity), Bluetooth (registered copyright), Transfer Jet (registered copyright), NFC, etc.

Moreover, in FIG. 2, four sets of numbers that are shown under the call terminal 10, the printing terminal 20, the relay apparatus 30, the call management system 50, the respective routers 70, the program supply system 90, the maintenance system 100, and the data server 80 indicate IP addresses in a general IPv4 in a simplified manner. For example, the IP address for the call terminal 10aa is "1.2.1.3". Moreover, while IPv6, not IPv4, may be used, an explanation is given with IPv4 to simplify the explanations.

The respective call terminals 10 may be used not only in a call among multiple business offices and a call among different rooms in the same business office, but also in a call within the same room, and a call between outdoors and indoors, or between outdoors and outdoors. When the respective call terminals 10 are used outdoors, communication is conducted via wireless such as a mobile telephone communication network, etc.

Here, the call terminal 10 shown in FIG. 2 is a terminal which realizes a call for a user (a person in charge) by transmission and reception of call data, and is a teleconference terminal, for example. Moreover, the printing terminal 20 is a terminal which prints, onto a sheet, print data such as image data, text data, etc., and is, for example, a printer, facsimile machine, a copying machine, or a MFP (multi-function peripheral) in which these functions are combined.

Moreover, the relay apparatus 30 is a computer system which relays call data among multiple call terminals 10. The call management system 50 is a computer system which integrally manages communication conditions, etc., of the relay apparatus 30, destination list management, management of communication condition and operation status of the call terminal 10 and the printing terminal 20, and a log-in authentication from the call terminal 10 and the printing terminal 20. The image of the image data may be a video image or a still image, or may be both the video image and the still image.

The program supply system 90 is a computer system which provides, via a communication network 2 to the respective ones of the call terminal 10, the printing terminal 20, the relay apparatus 30, the call management system 50, and the maintenance system 100, programs for use by the respective ones.

The data server 80 stores a screen shot of a personal verification document that is uploaded by the respective call terminal 10 and, moreover, controls viewing for a request for viewing the screen shot.

The maintenance system 100 is a computer system for sustaining, managing, or maintaining at least one of the call terminal 10, the printing terminal 20, the relay apparatus 30, the call management system 50, and the program supply system 90. For example, when the maintenance system 100 is installed domestically and the call terminal 10, the printing terminal 20, the relay apparatus 30, the call management system 50, or the program supply system 90 is installed abroad, the maintenance system 100 remotely conducts, via the communication network 2, maintenance operations such as sustaining, management, maintenance, etc., of at least one of the call terminal 10, the printing terminal 20, the relay apparatus 30, the call management system 50, or the program supply system 90. Moreover, the maintenance system 100 conducts, not via the communication network 2, maintenance of management of failure history, maintenance inspection, customers, manufacturing numbers, model numbers, etc., of at least one of the call terminal 10, the printing terminal 20, the relay apparatus 30, the call management system 50, and the program supply system 90.

Figure 3:
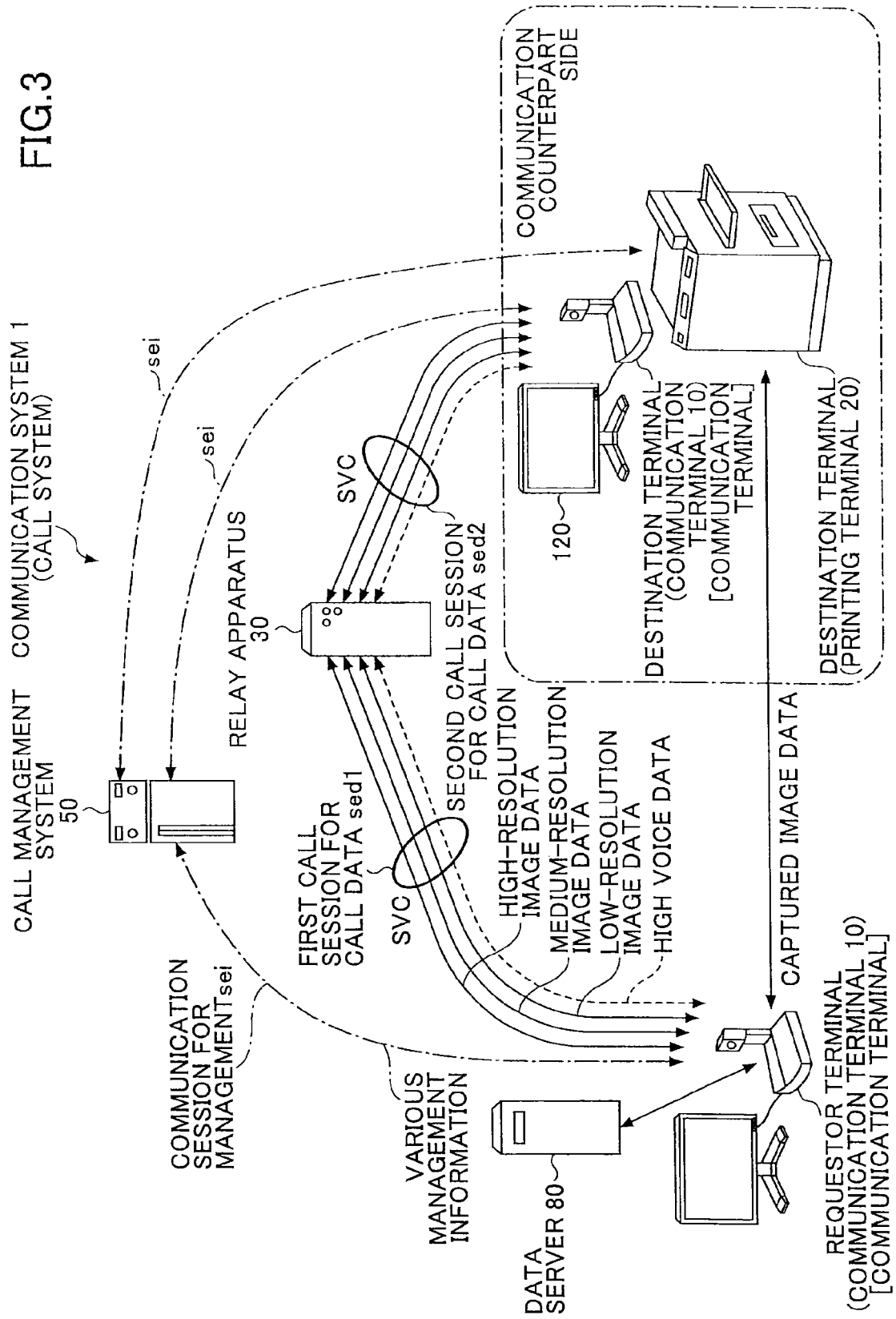
FIG. 3 is a schematic diagram illustrating communication conditions for realizing a call between call terminals.

Next, using FIG. 3, a communication condition for realizing a call between two call terminals is described. FIG. 3 is a conceptual diagram illustrating the communication condition for realizing the call between the call terminals.

In this call system 1, transmission and reception of various data sets for a call are conducted between the requestor terminal (the call terminal 10), which is a requestor of starting the call, and a destination terminal (the call terminal 10) as a communication counterpart of this requestor terminal. Moreover, print data are transmitted from the requestor terminal (call terminal 10) to the printing terminal 20 as a communication counterpart of this requestor terminal, and the print data are printed onto a sheet of paper in the printing terminal 20. The call terminal 10 has mainly a function for making a call, while the printing terminal 20 has mainly a function for printing, so that the respective processing capabilities differ.

Moreover, a communication session sei for management for transmitting and receiving various information sets is established between the requestor terminal and the call management system 50, between the destination terminal (call terminal 10) and the call management system 50, and between the destination terminal (printing terminal 20) and the call management system 50. Furthermore, this communication session sei is also a communication session for call control.

Moreover, the respective call terminals 10 use a communication scheme by predetermined call control and encoding schemes via the relay apparatus 30 to communicate call data.

Examples of the call control scheme include (1) SIP (Session Initiation Protocol), (2) H.323, (3) extended SIP protocol; (4) Instant messenger protocol; (5) Protocol using MESSAGE method in SIP; (6) Internet relay chat protocol (IRC (Internet Relay Chat)); (7) Protocol extending the Instant messenger protocol, etc. Of these, the Instant messenger protocol (4) is, for example, the protocol used in (4-1) XMPP (extensible messaging and presence protocol), (4-2) ICQ (registered trademark), AIM (registered trademark), Skype (registered trademark), etc. Moreover, (7) the Protocol extending the Instant messenger protocol is Jingle, for example.

Exemplary encoding schemes include H.264/SVC (scalable video coding), H.264/AVC (advanced video coding), etc. More specifically, when the encoding scheme is H.264/SVC, a first communication session sed1 for a call is established for transmitting and receiving four call data sets of high-resolution image data; medium-resolution image data; low-resolution image data; and voice data between the relay apparatus 30 and the call terminal 10 as the requestor terminal. Moreover, a second communication session sed2 for a call is established for transmitting and receiving four call data sets of high-resolution image data; medium-resolution image data; low-resolution image data; and voice data between the relay apparatus 30 and the call terminal 10 as the destination terminal.

Hardware Configuration of the Embodiment

Next, a hardware configuration of the present Embodiment is described. The call terminal 10 can be realized by a dedicated hardware unit (product) or a generic information processing apparatus, so that an external view thereof varies. For example, the external views include the external view shown in FIG. 2 or 3, or an external view of a PC (Personal Computer), a tablet, a smartphone, a PDA (personal digital assistant), etc. For the tablet, the smartphone, or the PDA, the display 120 is embedded in the call terminal 10. Moreover, even when the display 120 is not embedded therein, the call terminal 10 may include a projector to project what is displayed on the display 120.

The external view of the relay apparatus 30, the call management system 50, the program supply system 90, the maintenance system 100, and the data server 80 is the same as that for the general server computer, so that the explanation of the external view is omitted.

Figure 4:
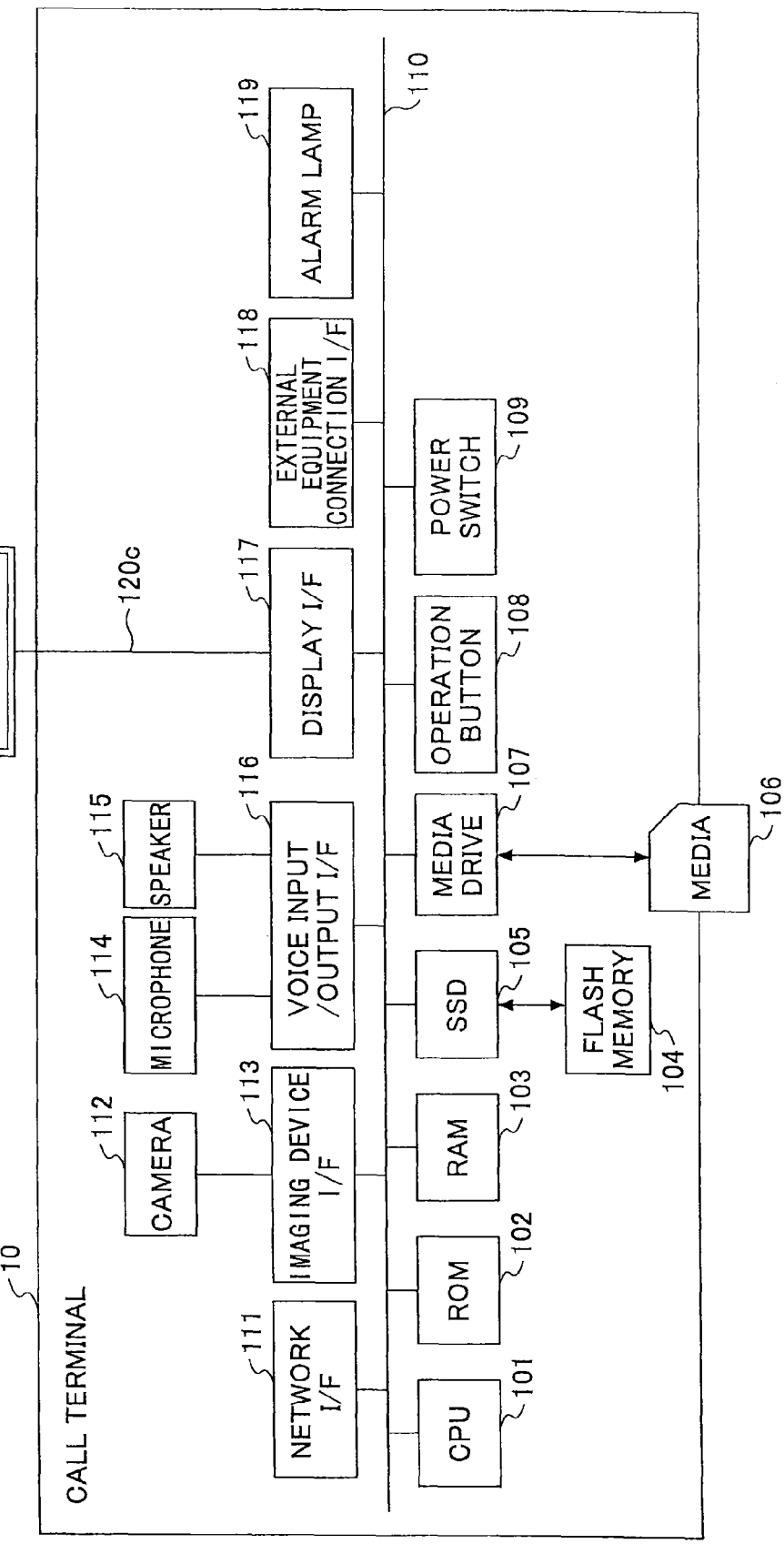
FIG. 4 is an exemplary hardware configuration diagram of the call terminal.

FIG. 4 is a hardware configuration diagram of the call terminal according to the present Embodiment. As shown in FIG. 4, the call terminal 10 according to the present Embodiment includes a CPU (central processing unit) 101 which controls an operation of the overall call terminal 10; a ROM (Read-only memory) 102 having stored therein a program for use in driving the CPU 101, such as an IPL (initial program loader), etc.; an RAM (Random access memory) 103 for use as a work area for the CPU 101; a flash memory 104 having stored thereon various programs and data sets such as programs for the call terminal 10, image data, voice data, etc.; an SSD (solid state drive) 105 which controls reading or writing of various data sets from/to the flash memory 104 in accordance with control of the CPU 101; a media drive 107 which controls reading or writing (storage) of data from/to the recording medium 106 such as a flash memory, etc.; an operation button 108 which is operated when a destination of the call terminal 10 is designated, etc.; a power switch 109 for turning ON/OFF power of the call terminal 10; and a network I/F (interface) 111 for using a communication network 2 to conduct data transmission.

Moreover, the call terminal 10 includes an embedded-type camera 112 which images an object to obtain image data in accordance with control of the CPU 101; an imaging device I/F 113 which controls driving of this camera 112; an embedded-type microphone 114 for inputting voice; an embedded-type speaker 115 for outputting voice; a voice input/output I/F 116 which processes input and output of a voice signal between the microphone 114 and the speaker 115 in accordance with control of the CPU 101; a display I/F 117 which transmits image data to an external display 120 in accordance with control of the CPU 101; an external equipment connection I/F 118 for connecting various external equipment units; an alarm lamp 119 which reports abnormalities of various functions of the call terminal 10; and a bus line 110 such as an address bus, a data bus, etc., for electrically connecting the above-described respective elements as shown in FIG. 4.

The display 120 is a display unit which includes organic EL and liquid crystal, which displays an object image, operations, etc. Moreover, the display 120 is connected to the display I/F 117 via a cable 120c. This cable 120c may be a cable for an analog RGB (VGA) signal, may be a cable for component video, and may be a cable for HDMI (registered copyright) (High-Definition Multimedia Interface) or a cable for a DVI (Digital Video Interactive) signal.

The camera 112 includes a lens and a solid-state imaging device which converts light to electrical charges to digitize an image (video) of the object; for the solid-state imaging device, CMOS (complementary metal oxidesemiconductor), CCD (charge coupled device), etc., are used.

To the external equipment connection I/F 118, external equipment units such as an externally-installed camera, an externally-installed microphone; an externally-installed speaker, etc., can be electrically connected respectively via a USB (universal serial bus), etc. When the externally-installed camera is connected, the externally-installed camera is driven with a precedence over the embedded camera 112 in accordance with control of the CPU 101. When the externally-installed microphone is connected or when the externally-installed speaker is connected, the externally-installed microphone or the externally-installed speaker is driven with a precedence over the embedded-type microphone 114 or the embedded-type speaker 115 in accordance with control of the CPU 101.

The recording medium 106 is configured to be removable with respect to the call terminal 10. Moreover, for a non-volatile memory which reads or writes data in accordance with control of the CPU 101, not only the flash memory 104, but also an EEPROM (Electrically erasable and programmable ROM), etc., may be used.

Figure 5:
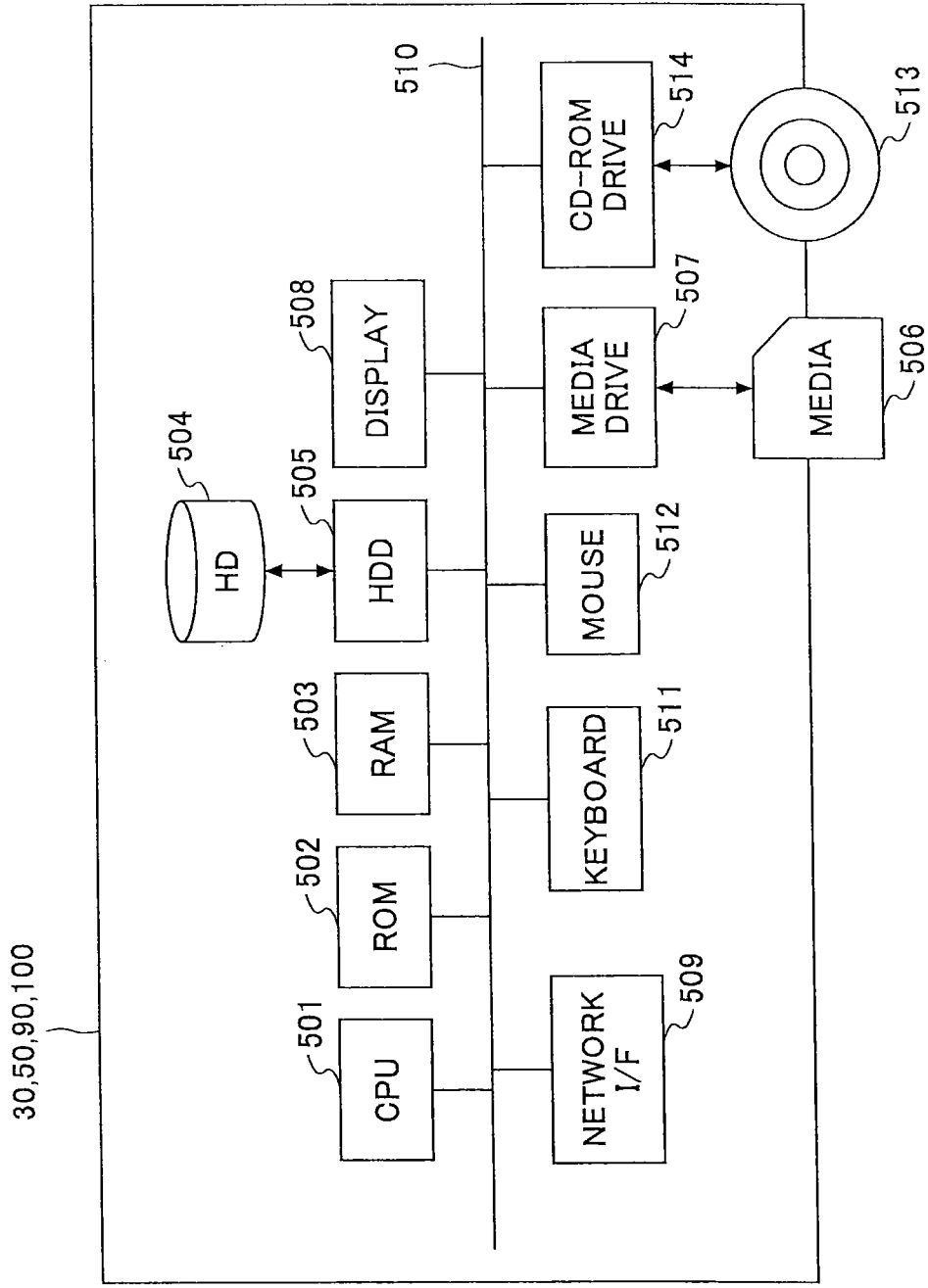
FIG. 5 is an exemplary hardware configuration diagram of a call management system 50.

FIG. 5 is a hardware configuration diagram of the call management system 50 according to the present Embodiment. The call management system 50 includes a CPU 501 which controls an operation of the overall call management system 50; a ROM 502 having stored thereon programs for use in driving the CPU 501 such as IPL, etc.; a RAM 503 for use as a work area for the CPU 501; an HD 504 having stored thereon various data sets and programs including programs for the call management system 50; a HDD (hard disk drive) 505 which controls reading or writing (storage) of various data sets from/to the HD 504 in accordance with control of the CPU 501; a media drive 507 which controls reading or writing (storage) of data from/to the recording media 506 of a flash memory, etc.; a display 508 which displays various information sets such as a cursor, a menu, a window, a character, an image, etc.; a network I/F 509 for conducting data communications using the communication network 2; a keyboard 511 which includes multiple keys for inputting a character, a numerical value, various instructions, etc.; a mouse 512 which performs execution of various selections or designation, a cursor movement, etc.; a CD-ROM drive 514 which controls reading or writing of various data sets from/to a CD-ROM (compact disc read only memory) 513 as one example of a removable recording medium; and a bus line 510 such as a data bus, an address bus, etc., for electrically connecting the above-described respective elements as shown in FIG. 5.

On the other hand, the relay apparatus 30, the program supply system 90, the maintenance system 100, and the data server 80 have the same hardware configurations as for the call management system 50, so that the explanation thereof is omitted. The HD 504 stores thereon various data and programs such as programs for controlling the relay apparatus 30, the program supply system 90, the maintenance system 100, and the data server 80, respectively.

It may be arranged for the respective programs for the call terminal 10, the printing terminal 20, the relay apparatus 30, the program supply system 90, the maintenance system 100, and the data server 80 to be recorded on a computer-readable recording medium (a recording medium 106, etc.) and distributed with a file in an installable or executable format. Moreover, other exemplary recording media include a CD-R (compact disc recordable), a DVD (digital versatile disk), a blue-ray disk, etc.

Figure 6:
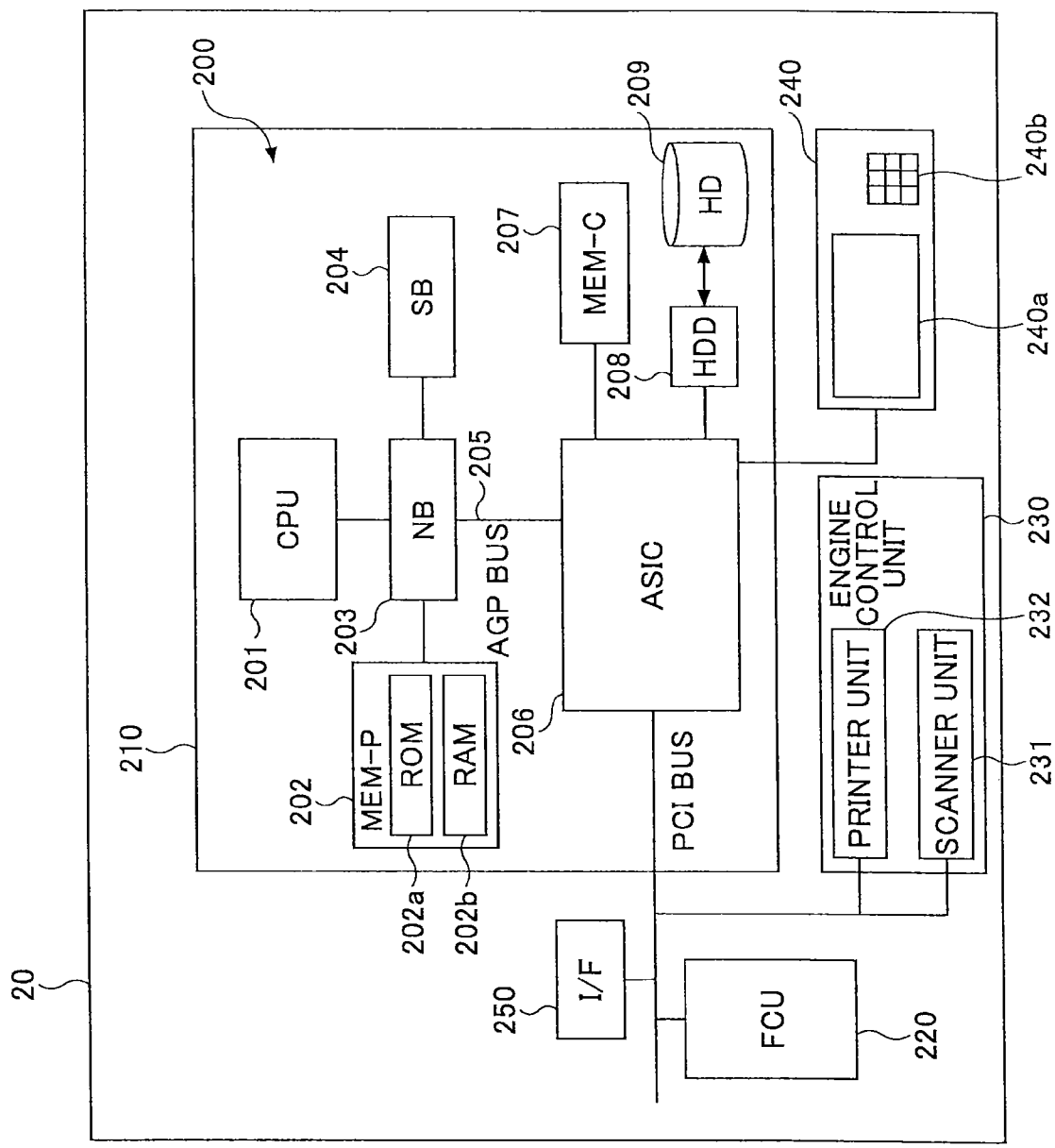
FIG. 6 is a hardware configuration diagram of a printing terminal.

FIG. 6 is a hardware configuration diagram of the call terminal 20 according to the present embodiment. The printing terminal 20 in this case is an MFP. As disclosed in FIG. 6, the printing terminal 20 includes a controller 210, an FCU (fax control unit) 220, an engine control unit 230, an operating face 240; and a communication interface unit 250. Of these, the engine control unit 230 includes a scanner unit 231 and a printer unit 232. Moreover, the operating face 240 includes a panel display unit 240*a* such as a touch panel, which displays a present set value, a selected screen, etc., and accepts input from an operator; and an operation unit 240*b* including a ten key which accepts a set value of a condition on image formation such as setting condition of concentration, and a start key for accepting copying start instructions. The controller 210 controls the overall printing terminal 20, and, for example, controls input from the operating face 240, communication, drawing, etc. The scanner unit 231 or the printer unit 232 includes a unit for image processing such as error diffusion, gamma transformation, etc.

With an application switching key of the operating face 240, the printing terminal 20 can successively switch between a document box function, a copying function, a printer function, and a facsimile function to select the switched result. It turns to a document box mode when the document box function is selected, a copying mode when the copying function is selected, and a facsimile mode when the facsimile function is selected.

The controller 210 includes a CPU 201, which is a main part of a computer; a system memory (MEM-P) 202; a north bridge (NB) 203, a south bridge (SB) 204, an ASIC (application specific integrated circuit) 206; a local memory (MEM-C) 207, which is a storage unit; an HDD 208; and an HD 209, which is a storage unit, and is configured such that an AGP (accelerated graphics port) bus 205 connects the NB 203 and the ASIC 206.

Of these, the CPU 201 is a control unit which controls the overall printing terminal 20. The NB 203, which is a bridge for connecting the CPU 201, the MEM-P 202, the SB 204, and the AGP bus 205, includes an AGP target and a PCI (peripheral component interconnect) master, and a memory controller which controls reading and writing with respect to the MEM-P 202.

The MEM-P 202 includes a ROM 202*a*, which is a memory for storing data and program for causing the respective functions of the controller 210 to be realized; an RAM 202*b* for use as a memory for drawing at the time of memory printing, and data and program development. It may also be configured for programs stored in the RAM 202*b* to be recorded and provided on a computer-readable recording medium such as a CD-ROM, FD, CD-R, DVD, etc., in a file with an installable or executable format.

The SB 204 is a bridge for connecting the NB 203 with a PCI device and a peripheral device. The ASIC 206, which is an IC (integrated circuit) for use in image processing that includes a hardware element for image processing, has a role of a bridge which connects the AGP bus 205, the PCI bus, the HD 208, and the MEM-C 207. This ASIC 206 includes a PCI unit which transfers data via a PCI bus between the scanner unit 231 and the printer unit 232; multiple DMACs (Direct Memory Access Controllers) which perform rotation, etc., of image data by a hardware logic, etc.; a memory controller which controls the MEM-C 207; an arbiter (ARB) which forms the core of the ASIC 206; an AGP master and a PCI target; and a PCI unit which transfers data via the PCI bus between the scanner unit 231 and the printer unit 232. A FCU 220 is connected to this ASIC 206 via the PCI bus. It may also be arranged to connect not only the FCU 220, but also an USB (universal serial bus) interface and an IEEE 1394 (Institute of Electrical and Electronics Engineers 1394) to the ASIC 206.

The MEM-C 207 is a local memory for use as a code buffer and an image buffer for copying. The HD 209 is storage for accumulating image data, font data used at the time of printing, and forms. The HD 209 controls reading or writing of data with respect to the HD 209 in accordance with control of the CPU 201. The AGP bus 205 is a bus interface for a graphics accelerator card proposed for accelerating graphics processing; directly accessing MEM-P 202 with high throughput may accelerate the graphics accelerator card.

Functional Configuration of the Embodiment

Figure 7:
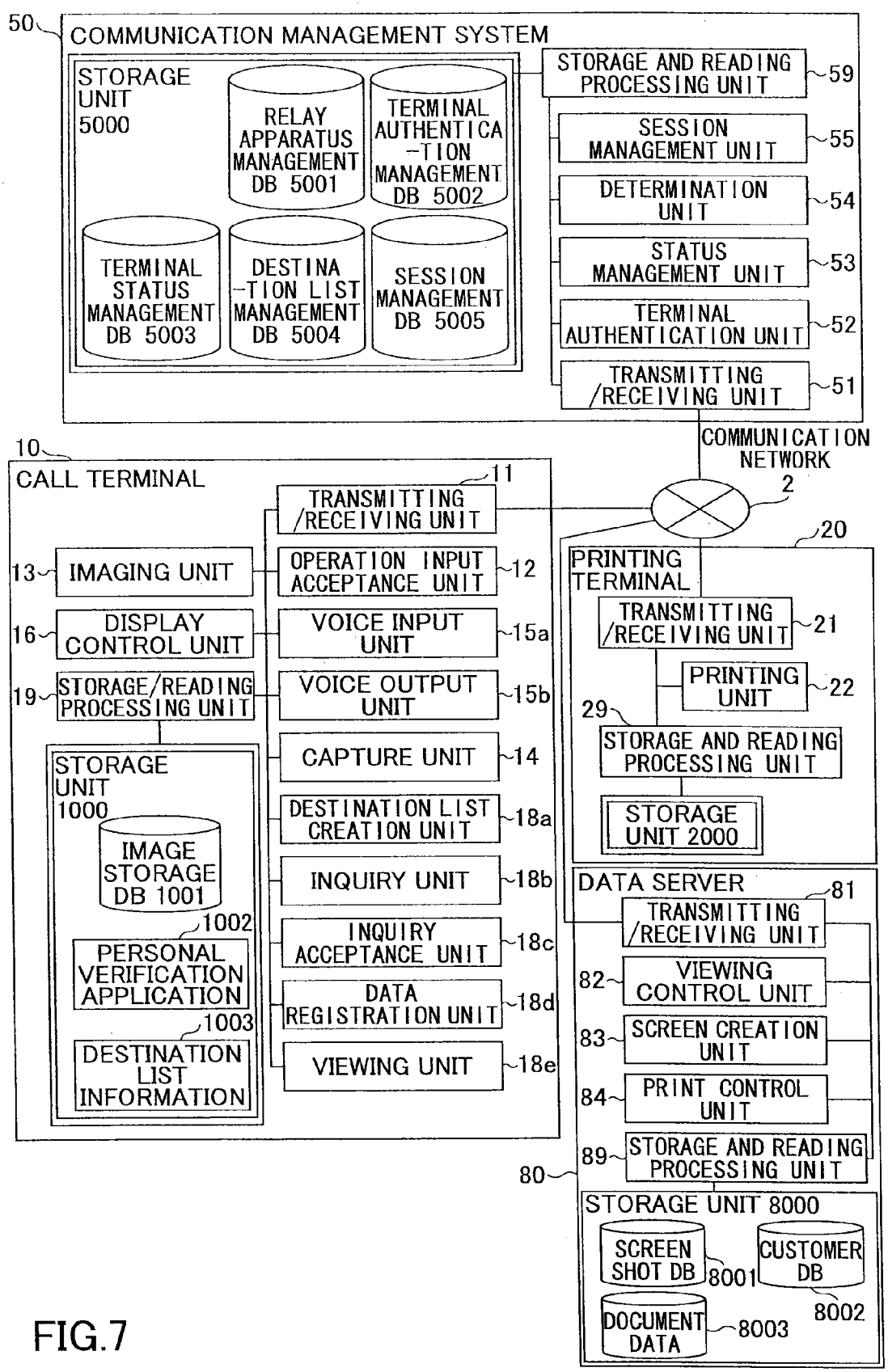
FIG. 7 is an exemplary functional block diagram of the call terminal, the printing terminal, the call management system, and a data server that make up a part of a call system 1.

Next, a functional configuration of the present Embodiment is described. FIG. 7 is a functional block diagram illustrating the call terminal 10, the printing terminal 20, the call management system 50, and the data server 80 that make up a part of the call system 1 according to the present Embodiment. Connections are made in FIG. 7 for the call terminal 10, the printing terminal 20, the call management system 50, and the data server 80 to conduct data communication via the communication network 2. The relay apparatus 30, the program supply system 90, and the maintenance system 100 are omitted.

Functional Configuration of the Call Terminal

The call terminal 10 includes a transmitting and receiving unit 11; an operation input acceptance unit 12; an imaging unit 13; a capture unit 14; a voice input unit 15*a*; a voice output unit 15*b*; a display control unit 16; a destination list creation unit 18*a*, an inquiry unit 18*b*, an inquiry acceptance unit 18*c*; a data registration unit 18*d*; a viewing unit 18*e*; and a storage and reading processing unit 19. These respective units are functions or means realized by any of the respective constituting elements shown in FIG. 4 operating by instructions from the CPU 101 in accordance with programs for the call terminal 10 that are developed on the RAM 103 from the flash memory 104.

Moreover, the call terminal 10 includes the RAM 103, which is shown in FIG. 4; and a storage unit 1000 which is configured by the flash memory 104 shown in FIG. 4. Destination list information 1003, a personal verification application 1002, and an image storage DB 1001 that are described below are stored in this storage unit 1000.

Destination List Information

FIG. 8 is a diagram schematically illustrating one example of the destination list information 1003. The destination list information 1003 includes a terminal ID, a type, a terminal name, an operating status, and an IP address. These information sets are managed in a terminal status management table of the below-described call management system 50. The destination list creation unit 18*a* creates the destination list information 1003 by obtaining, from the call management system 50, the terminal ID, the type, the terminal name, the operating status, and the IP address for one having the type as the printing terminal out of destination terminal IDs registered in the destination terminal IDs of the terminal status management table. The destination list creation unit 18*a*, for example, periodically requests a terminal status management table from the call management system 50, and updates the destination list information 1003, as needed.

The Respective Functional Configurations of the Call Terminal

The transmitting/receiving unit 11 of the call terminal 10 shown in FIG. 7 is realized by the network I/F 111 shown in FIG. 4, and instructions from the CPU 101 shown in FIG. 4, and conducts transmission and reception of various data (or information) with a different terminal, apparatus, or system via the communication network 2. Before starting a call with a desired destination terminal, this transmitting/receiving unit 11 starts receiving the respective status information sets which indicate a status of the respective terminals as a candidate communication counterpart from the call management system 50.

Moreover, in the transmitting/receiving unit 11, with an acceptance of the above-described power on as a trigger, the present IP address of the requestor terminal and log-in request information indicating that a log-in is to be requested are automatically transmitted to the call management system 50 via the communication network 2. Moreover, when the user changes the power switch 109 from an ON state to OFF, the transmitting/receiving unit 11 transmits, to the call management system 50, status information that a power supply is to be turned OFF, after which the operation input acceptance unit 12 turns the power OFF completely. In this way, the fact that the call terminal 10 has switched from the power ON status to the power OFF may be grasped on the call management system 50 side. It may also be arranged for the trigger for the log-in request to be not the power ON, but instruction inputting by the user into the call terminal 10.

The operation input acceptance unit 12, which is realized by instructions from the CPU 101 shown in FIG. 4, accepts various inputs by the user. For example, when the user turns ON the power switch 109 of the call terminal, the operation input acceptance unit 12 shown in FIG. 7 accepts the power ON to turn ON the power supply.

The imaging unit 13, which is realized by the imaging device I/F 113 and the camera 112 shown in FIG. 4, and instructions from the CPU 101 shown in FIG. 4, images the subject to output image data obtained by this imaging.

The capture unit 14, which is realized by instructions from the CPU 101 shown in FIG. 4, captures a screen which is displayed on the display 120 by the display control unit 16 when a permission to capture a personal verification document is received from an inquiry acceptance unit 18*c* of a call terminal of a conference counterpart. At the time of the capturing, a tone such as an effect tone from a voice output unit 15*b* may be output such that it is easy to recognize for the customer. The storage and reading processing unit 19 temporarily stores a captured screen shot to an image storage DB 1001. The temporarily stored screen shot is transmitted to the data server 80 via the communication network 2 from the transmitting and receiving unit 11 by the person in charge.

As for the voice input unit 15*a*, which is realized by a voice input and output I/F 116 and instructions from the CPU 101 shown in FIG. 4, after voice of the user is converted to a voice signal by the microphone 114, voice data related to this voice signal is input thereto. The voice output unit 15*b*, which is realized by the voice input and output I/F 116, and the instructions from the CPU 101 shown in FIG. 4, outputs the voice signal related to the voice data to the speaker 115, from which the voice is output.

The display controller 16 is realized by the display I/F 117, and instructions from the CPU 101 shown in FIG. 4, performs control for transmitting, to the display 120, image data in which image data imaged by the imaging unit 13 and image data received from the call terminal of the conference counterpart are combined.

The destination list creation unit 18*a* creates destination list information 1003 and creates a destination list screen based on the destination list information 1003.

The inquiry unit 18*b* inquires whether image data may be stored in a call terminal which transmits image data (the inquiry unit 18*b* is one example of a permission requesting unit in the claims). In response to the inquiry from the inquiry unit 18*b*, the inquiry acceptance unit 18*c* transmits capture permission that image data may be stored even without an inquiry.

The data registration unit 18*d* registers, with the data server 80, the screen shot which is captured by the capture unit 14 and stored in the image storage DB 1001. The IP address of the data server 80 is reported from the call management system 50 to the call terminal, or set in the personal verification application A in advance.

The capture unit 14, the inquiry unit 18*b*, the inquiry acceptance unit 18*c*, and the data registration unit 18*d* are functions realized by executing the personal verification application 1002. In other words, in the personal verification application 1002, a function as the personal verification application A becomes valid when it is activated by the person in charge, while the personal verification application B becomes valid when it is activated by the report from the personal verification application A.

When the person in charge views the screen shot registered with the data server 80, the viewing unit 18*e* downloads the screen shot from the data server 80. The viewing unit 18*e* is a browser application, for example.

The storage and reading processing unit 19, which is realized by instructions from the CPU 101 shown in FIG. 4, or executed by the SSD 105 shown in FIG. 4 and the instructions from the CPU 101 shown in FIG. 4, performs processing of storing various data sets to the storage unit 1000, or reading various data sets stored into the storage unit 1000. This storage unit 1000 has stored thereon a terminal ID (identification) which indicates identification information for identifying the call terminal 10; a password, etc.

Moreover, each time image data and voice data are received when conducting a call with a destination terminal, the received data are overwritten and stored in the storage unit 1000. An image is displayed on the display 120 by using image data before being overwritten, and voice is output from the speaker 115 by using voice data before being overwritten.

Now, the personal verification application 1002 is described. When the person in charge presses a below-described predetermined button 1205, the storage and reading processing unit 19 reads the personal verification application 1002 and the CPU 101, in FIG. 4, executes a personal verification application A. In this way, the personal verification application A is activated. The personal verification application A transmits a report which causes a call terminal transmitting image data to activate a personal verification application B.

When it is detected that the customer has performed a screen capture permission operation (below-described pressing of the decision button 1202) by the operation input acceptance unit 12, the personal verification application B, which is activated by the counterpart terminal, transmits the capture permission to the call terminal 10 which has the personal verification application A activated. The capture permission may be information indicating that storage is permitted.

Therefore, in the personal verification application 1002, the function as the personal verification application A (for example, the inquiry unit 18*b*) becomes valid when the person in charge activates, while the function as the personal verification application B (for example, the inquiry acceptance unit 18*c*) becomes valid when it is activated by the report from the personal verification application A.

The personal verification application A being activated is an example of operating in "an operation mode" in the claims, while the personal verification application B being activated is an example of operating in "an imaging mode" in the claims.

It is not mandatory for the personal verification applications A and B to be activated, so that it suffices for the function of the personal verification application to be embedded in the program for the call terminal 10.

The terminal ID according to the present Embodiment and the below-described relay apparatus ID represent identification information such as the language, character, symbol, or various signs, etc., that are used for uniquely identifying the terminal 10 and the relay apparatus 30. Moreover, the terminal ID and the relay apparatus ID may be identification information in which at least two are combined out of the language, character, symbol and various signs.

Functional Configuration of the Printing Terminal

The printing terminal 20 includes a transmitting and receiving unit 21; a printing unit 22; and a storage and reading processing unit 29. These respective units are functions or means realized by any of the respective constituting elements shown in FIG. 6 operating by instructions from the CPU 201 in accordance with programs for the printing terminal 20 that are developed on the RAM 102*b*.

Moreover, the printing terminal 20 includes a storage unit 2000 which is configured by the HD 209 shown in FIG. 6 and the RAM 102*b* shown in FIG. 6. Image data sent from the call terminal 10 is stored in this storage unit 2000.

Of the respective functional configurations, the transmitting/receiving unit 21, which is realized by the network I/F 250 shown in FIG. 6, and instructions from the CPU 201 shown in FIG. 6, conducts transmission and reception of various data (or information) with a different terminal, apparatus, or system via the communication network 2.

The printing unit 22, which is realized by the printer unit 232 shown in FIG. 6, and instructions from the CPU 201 shown in FIG. 6, prints image data stored in the storage unit 1000 onto a sheet of paper.

The storage and reading processing unit 29, which is realized by instructions from the CPU 201 shown in FIG. 6, or executed by the HDD 108 shown in FIG. 6 and the instructions from the CPU 201, performs processing of storing various data sets to the storage unit 1000, or reading various data sets stored into the storage unit 1000.

Functional Configuration of Call Management System

The call management system 50 includes a transmitting and receiving unit 51; a terminal authentication unit 52; a status management unit 53; a determination unit 54; a session management unit 55; and a storage and reading processing unit 59. These respective units are functions or means realized by any of the respective constituting elements shown in FIG. 5 operating by instructions from the CPU 201 in accordance with programs for the call management system 50 that are developed on the RAM 203 from the HD 504. Moreover, the call management system 50 includes a storage unit 5000 which is configured by the HD 204 shown in FIG. 5. In this storage unit 2000, DBs (5001, 5002, 5003, 5004, 5005) made up of the respective tables as shown below are configured.

Relay Apparatus Management Table

FIG. 9 is a conceptual diagram illustrating a relay apparatus management table. A relay apparatus management DB 5001 which includes a relay apparatus management table as shown in FIG. 9 is configured in the storage unit 5000. In this relay apparatus management table, for each relay apparatus ID of each relay apparatus 30, an operating status of each relay apparatus 30; received date/time at which status information indicating the operating status is received by the call management system 50; the IP address of the relay apparatus 30; and the maximum data call speed (Mbps) in the relay apparatus 30 are associated and managed.

Terminal Authentication Management Table

FIG. 10 is a conceptual diagram illustrating a terminal authentication management table. A terminal authentication management DB 5002 which includes a terminal authentication management table as shown in FIG. 10 is configured in the storage unit 5000. In this terminal authentication management table, a password for authentication is associated and managed for the respective terminal IDs of all of the terminals 10 managed by the call management system 50.

Terminal Status Management Table

FIG. 11 is a conceptual diagram illustrating a terminal authentication management table. A terminal status management DB 5003 which includes a terminal status management table as shown in FIG. 11 is configured in the storage unit 5000. In this terminal status management table, for each call ID of the respective call terminals 10 and the respective printing terminals 20, the type of the terminal; a destination name when the respective terminal is set to be a destination; an operating status of the respective terminal; a received date/time at which the below-described log-in request information is received by the call management system 50; and the IP address of the respective terminal are managed in association. The terminal ID, the type of terminal, and the destination name are stored and managed when registering with the call management system 50 in order to conduct communication using the call system 1.

Destination List Management Table

FIG. 12 is a conceptual diagram illustrating a destination list management table. A destination list management DB 5004 which includes a destination list management table as shown in FIG. 12 is configured in the storage unit 5000. In this destination list management table, terminal IDs of destination terminals registered as a candidate for a communication counterpart are all associated with the terminal ID of a requestor terminal requesting a start of a call, and managed. The candidate for the communication counterpart is updated by a request from an arbitrary requestor terminal to the call management system 50 to add or delete.

Moreover, a terminal ID of the printing terminal 20 is registered in the destination list management table. This printing terminal 20 is, for example, a printing terminal 20 near a call terminal of a conference counterpart to which the conference counterpart can go and pick up the printed material and a call terminal to which a person in charge at the own location can go and pick up the printed material.

Session Management Table

FIG. 13 is a conceptual diagram illustrating a session management table. A session apparatus management DB 5005 which includes a session management table as shown in FIG. 13 is configured in the storage unit 5000. In this session management table, a relay apparatus ID of the relay apparatus 30 for use in relaying call data (image data and voice data); a terminal ID of a requestor terminal; a terminal ID of a destination terminal; a delay time (ms) of receipt when the image data are received at the destination terminal; and a received data/time at which delay time information indicating the delay time that is sent from the destination terminal is received at the call management system 50 are managed in association. When a call is conducted between the two call terminals 10, the received date/time of the delay time information may be managed based on the delay time information transmitted from the requestor terminal, not the destination terminal. When conducting the call among three or more call terminals 10, the received date/time of the delay time information is managed based on delay time information transmitted from the terminal 10 on the receiving side of the image data and the voice data.

The Respective Functional Configurations of Call Management System

Next, the respective functional configurations of the call management system 50 are described in detail. The transmitting/receiving unit 51, which is executed by the network I/F 509 shown in FIG. 5, and instructions from the CPU 501 shown in FIG. 5, conducts transmission and reception of various data (or information) with a different terminal, apparatus, or system via the communication network 2.

The terminal authentication unit 52, which is realized by instructions from the CPU 501 shown in FIG. 5, searches the terminal authentication management table with the terminal ID and the password included in the log-in request information received via the transmitting/receiving unit 51 as search keys and determines whether the same terminal ID and password are managed in this terminal authentication management table to perform terminal authentication.

The status management unit 53, which is realized by instructions from the CPU 501 shown in FIG. 5, stores and manages, in association in the terminal status management table, the terminal ID of the requestor terminal, the operating status of the requestor terminal, the received date/time at which the log-in request information is received at the call management system 50, and the IP address of the requestor terminal in order to manage the operating status of the requestor terminal from which the log-in request is made. Moreover, based on the status information to turn off power that is sent from the call terminal 10 or the printing terminal 20, the status management unit 53 changes the operating status indicating the terminal status management table as on-line to offline.

The determination unit 54, which is realized by instructions from the CPU 501 shown in FIG. 5, determines whether the operating status indicated in the operating status information is "on-line". Moreover, when the determination unit 54 determines that it is "on-line", it determines that the operating status can be transmitted to a predetermined call terminal 10 and, when it determines that it is not "on-line", determines that the operating status information cannot be transmitted to the predetermined call terminal 10.

The session management unit 55, which is realized by instructions from the CPU 501 shown in FIG. 5, stores and manages, in the session management table of the storage unit 5000 in association, a relay apparatus ID of the relay apparatus 30 for use in relaying the call data, a terminal ID of the requestor terminal, a terminal ID of the destination terminal, a delay time (ms) of receipt when the image data are received in the destination terminal, and received date/time at which the delay time information indicating the delay time that is sent from the destination terminal is received by the call management system 50. Moreover, the session management unit 55 creates a session ID for use in establishing a communication session.

The storage and reading processing unit 59, which is executed by the HDD 505 shown in FIG. 5, and instructions from the CPU 501 shown in FIG. 5, performs a process of storing various data in the storage unit 5000 and reading various data stored in the storage unit 5000.

Functional Configuration of Data Server

The data server 80 includes a transmitting/receiving unit 81; a viewing control unit 82; screen creation unit 83; a print control unit 84; and a storage and reading processing unit 85. These respective units are functions or means realized by any of the respective constituting elements shown in FIG. 5 operating by instructions from the CPU 501 in accordance with programs for the data server that are developed on the RAM 503.

The transmitting/receiving unit 81, which is realized by the network I/F 509 shown in FIG. 5, and instructions from the CPU 501 shown in FIG. 5, conducts transmission and reception of various data (or information) with the call terminal 10 via the communication network 2.

The viewing control unit 82 accepts a request to view a screen shot stored in the screen shot DB that is received via the transmitting/receiving unit 81 from the call terminal 10. The viewing control unit 82 is, for example, a web server.

The screen creation unit 83 creates screen data such as HTML, etc., used by a CSS (Cascading Style Sheets), JavaScript (registered copyright), etc., and transmits the created results to the call terminal 10 via the transmitting/receiving unit 81.

When a print event is received, the print control unit 84 requests printing to the printing terminal 20 near the communication counterpart. Details are described in Embodiment 3.

The storage and reading processing unit 89, which is executed by the HDD shown in FIG. 5, and instructions from the CPU 501 shown in FIG. 5, performs a process of storing various data in the storage unit 8000 and reading various data stored in the storage unit 8000. A screen shot is registered in a folder with a terminal ID of the call terminal 10 which transmitted the screen shot as a folder name, and a screen shot is read from a folder with a terminal ID of the call terminal 10 which requested the screen shot as a folder name.

Moreover, the data server 80 configures a document data DB 8003, a customer DB 8002, and a screen shot DB 8001 as described below in the storage unit 8000.

Customer ID Table

Figure 14:
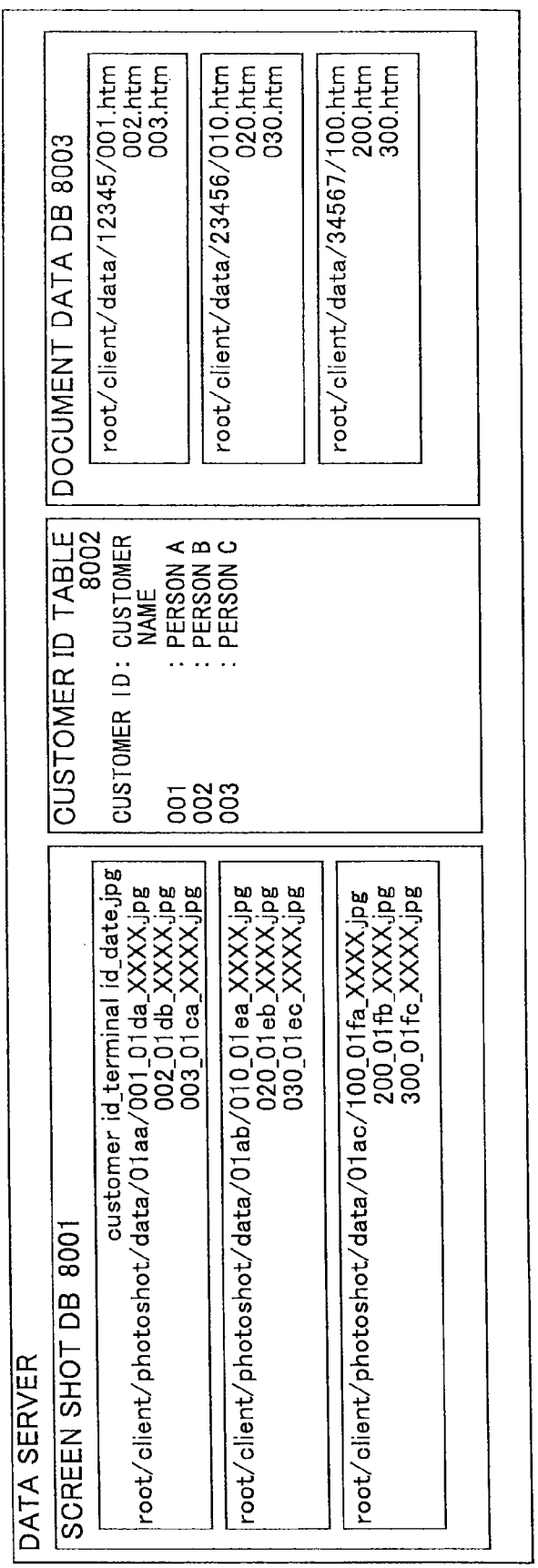
FIG. 14 is a diagram illustrating one example of a customer DB, a document data DB, and a screen shot DB.

FIG. 14 is a conceptual diagram which indicates a customer DB 8002; a document data DB 8003; and a screen shot DB 8001. The customer DB 8002 which includes a customer ID table as shown in FIG. 14 is configured in the storage unit 8000. In the customer ID table, which is created for each person in charge, linked to a person in charge ID, a customer name and a customer ID for which the person in charge handles are registered in association. Besides the customer name, an address, a telephone number, etc., may be registered. The person in charge, etc., performs membership registration of customers, so that the customer ID table is created for all of the customers without exception. Thereafter, an examination for membership registration is performed once all documents including the personal verification document are complete, and, upon passing the examination, registration is performed as a formal member. Except for a system administrator, etc., the customer ID table may be accessed by only the person in charge.

Screen Shot DB

In the storage unit 8000 is configured the screen shot DB 8001 in which a screen shot as illustrated in FIG. 14 is registered. In other words, the screen shot DB 8001 is created for each call terminal of the person in charge in a folder called "/client/photoshot/data/" of a root directory of a data server. "01ga", "01ab", and "01ac" are terminal IDs used by each person in charge. A screen shot "001_01da_XXXX.jpg" of the personal verification document imaged by the person in charge, etc., is stored. "001" is a customer ID, "01da" is a terminal ID of a call terminal on the customer side, and "XXXX" is date/time. These information sets are used for the file name of image data of the screen shot to link the customer ID, the terminal ID, and data/time to the image data of the screen shot. One customer may have multiple screen shots.

Moreover, a mode of linking the screen shot and the customer ID by including the customer ID in a file name of the screen shot as shown is merely an example, so that the screen shot may be read with the customer ID as a key. For example, a size and an address of a storage unit in which the screen shot is stored may be linked to the customer ID, or a data Path may be linked thereto.

Document Data DB

In the storage unit 8000 is configured the document data DB 8003 in which document data as illustrated in FIG. 14 are registered. The screen shot DB 8003 is created for each person in charge in a folder called "/client//data/" of a root directory of the data server 80. "12345", "23456", and "34567" are person in charge IDs. Document data "001.htm", etc., of the customer handled by the person in charge is stored in a folder of the person in charge. The customer ID is used for the file name of the document data to link the customer ID and the document data. The document data are data in which applications, contracts, letters of acceptance, etc., of the customer are digitized. One customer may have multiple document data sets.

Moreover, a mode of linking the document data and the customer ID by including the customer ID in a file name of the document data as shown is merely an example, so that the document data may be read with the customer ID as a key. For example, a size and an address of a storage unit in which the document data are stored may be linked to the customer ID, or a data Path may be linked thereto.

Processing or Operation of Embodiment

Figure 15:
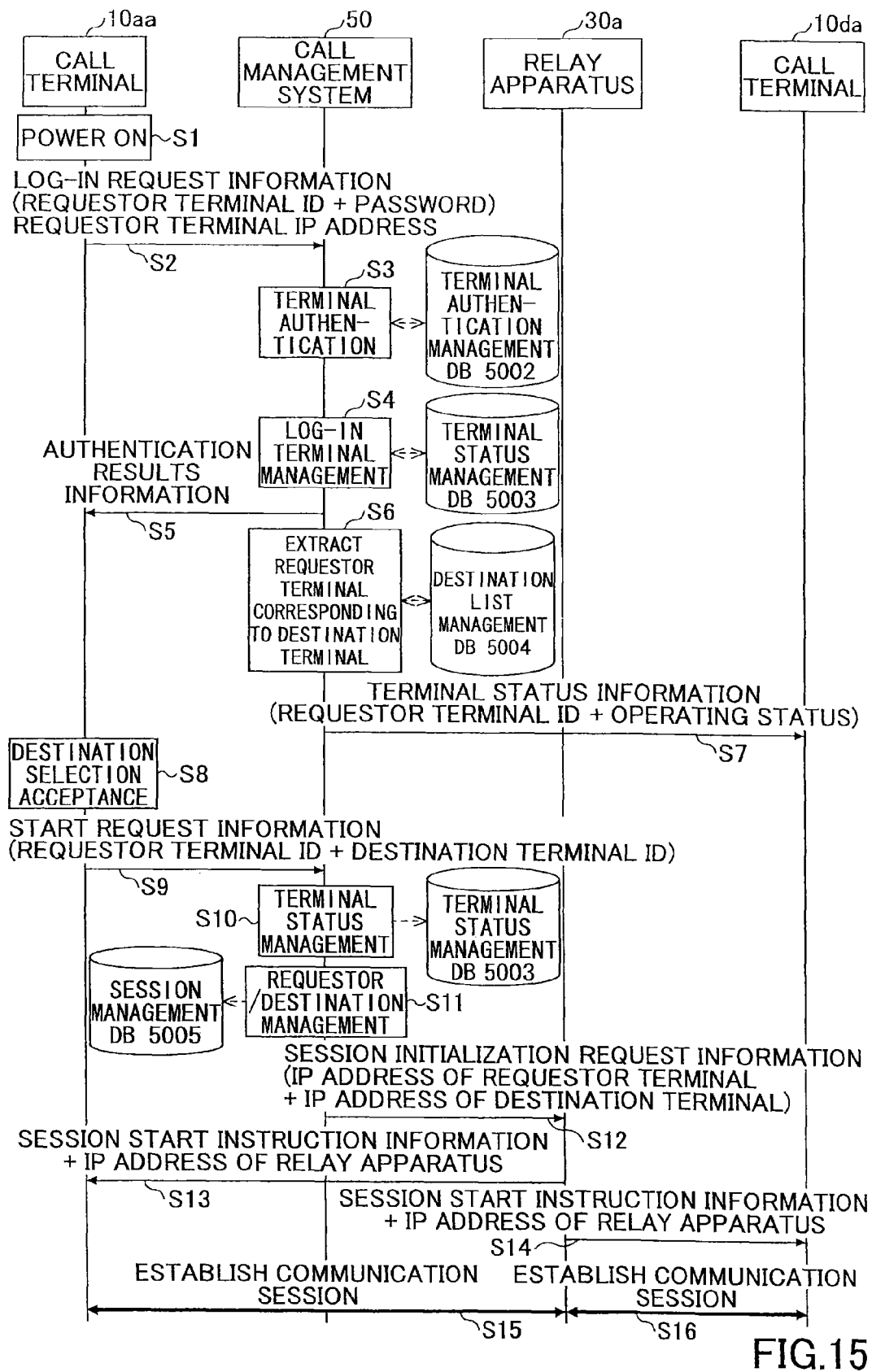
FIG. 15 is a sequence diagram illustrating a process of making preparations for starting a call between call terminals and establishing a session.

Next, using FIG. 15, a processing or operation of the present Embodiment is described. FIG. 15 is a sequence diagram illustrating a process of making preparations for starting a call between call terminals and establishing a session.

S1: First, when the user (the person in charge) of the requestor terminal (a call terminal 10aa) turns ON the power switch 109, the operation input acceptance unit 12 accepts the power ON to turn ON the power of the call terminal 10.

S2: With the acceptance of the power ON as a trigger, the transmitting and receiving unit 11 transmits log-in request information indicating a log-in request to the call management system 50 via the communication network 2. This log-in request information includes a password and a terminal ID for identifying the terminal 10aa, which is the requestor terminal. The terminal ID and the password are data read from the storage unit 1000 via the storage and reading processing unit 19 to be sent to the transmitting and receiving unit 11. When the log-in request information is transmitted from the requestor terminal (the terminal 10aa) to the call management system 50, the call management system 50, which is the receiver, may grasp the IP address of the terminal 10aa, which is the transmitter. Moreover, the log-in request may be set with not the power on, but input of user instructions as a trigger. Furthermore, it may be arranged for the user to be able to input the terminal ID and the password to the requestor terminal.

S3: Next, with the terminal ID and the password that are included in the log-in request information received via the transmitting and receiving unit 51 as search keys, the terminal authentication unit 52 of the call management system 50 performs terminal authentication by determining whether the same terminal ID and the same password are managed in this terminal authentication table.

S4: When it is determined by the terminal authentication unit 52 to be a log-in request from the call terminal 10 having a valid usage privilege since the same terminal ID and the same password are managed in this terminal authentication unit 52, the status management unit 53 stores, in association in the terminal status management table, an operating status; received date/time at which the log-in request information was received; and the IP address of the terminal 10*aa* for each record indicated by the destination name, the type of the terminal, and the terminal ID of the call terminal 10*aa*.

S5: Then, the transmitting/receiving unit 51 of the call management system 50 transmits authentication results information indicating authentication results obtained by the terminal authentication unit 52 via the communication network 2 to the requestor terminal (the call terminal 10*aa*) which made the log-in request.

S6: The storage and reading processing unit 59 of the call management system 50 searches the destination list management table based on the terminal ID "01aa" of the requestor terminal (the call terminal 10*aa*) which made the log-in request to extract the terminal ID of a different requestor terminal which registers, as a candidate of a communication counterparty, a terminal ID "01aa" of the requestor terminal (call terminal 10*aa*). Here, for brevity and simplicity of explanations, a case is described in which the terminal ID extracted in step S6 is a terminal ID "01da" of the call terminal 10*da*.

S7: Next, the transmitting and receiving unit 51 transmits, to the terminal 10*da*, "the status information of the terminal" including operating status information indicating the operating status of the requestor terminal (the call terminal 10*aa*) and the terminal ID "01aa" of the requestor terminal (the call terminal 10*aa*). In this way, the transmitting and receiving unit 11 of the call terminal 10*da* receives status information of the terminal 10*aa*.

Thereafter, the terminal 10*aa* requests, from the call management system 50, the destination terminal ID registered in the destination list management table to obtain the operating status of the respective terminals and destination list information (terminal ID, destination name). The display control unit 16 of the terminal 10*aa* displays, on the display 508, a destination list screen (not shown) which displays, in a listing, a destination list.

S8: When the user selects a destination terminal with which a call is started from the listing of the destination list, the operation input acceptance unit 12 accepts a request for starting a call with the destination terminal (the call terminal 10*db*).

S9: The transmitting and receiving unit 11 of the requestor terminal (the call terminal 10*aa*) transmits, to the call management system 50, start request information which includes a terminal ID "01aa" of the requestor terminal (call terminal 10*aa*) and a terminal ID "01da" of the destination terminal (call terminal 10*da*) and which indicates a desire to start a call. In this way, the transmitting and receiving unit 51 of the call management system 50 may receive an IP address "1.2.1.3" of the requestor terminal (the call terminal 10*aa*), which is the transmitter, and the start request information.

S10: Then, based on the terminal ID "01aa" of the requestor terminal (call terminal 10*aa*) and the terminal ID "01da" of the destination terminal (call terminal 10*da*) that are included in the start requesting information, the status management unit 53 changes, from "on-line (call possible)" to "offline (call ongoing)", an operating status field portion of records respectively containing the terminal ID "01aa" and the terminal ID "01da".

S11: Next, the session management unit 55 stores and manages, in association in the session management table of the storage unit 5000, the relay apparatus ID "111a" of the relay apparatus 30*a*, the terminal ID "01aa" of the requestor terminal (the call terminal 10*aa*) and the terminal ID "01da" of the destination terminal (the call terminal 10*da*). Then, the relay apparatus 30*a* with an IP address which is close to the IP address of the requestor terminal (the call terminal 10*aa*) is selected, for example.

S12: Next, the transmitting and receiving unit 51 of the call management system 50 transmits session initialization request information to the delay apparatus 30*a*. In this way, the relay apparatus 30*a* receives session initialization request information. This session initialization request information, which is an instruction which initializes a communication session of the relay apparatus 30, includes an IP address "1.2.1.3" of the requestor terminal (the call terminal 10*aa*) and an IP address "1.3.2.3" of the destination terminal (the call terminal 10*da*). The respective IP addresses are IP addresses respectively corresponding to the terminal ID of the requestor terminal (the call terminal 10*aa*) and the terminal ID of the destination terminal (the call terminal 10*db*) that are received in step S62 in the terminal status management table.

S13: Next, the relay apparatus 30*a* transmits session start instruction information to the requestor terminal (the call terminal 10*aa*) based on the IP address "1.2.1.3" of the requestor terminal (the call terminal 10*aa*) that was received in step S12. This session start instruction information is an instruction for the requestor terminal (the call terminal 10*aa*) to start the communication session. Moreover, at this time, the IP address "1.2.1.2" of the relay apparatus 30*a* is also transmitted.

S14: Similarly, the relay apparatus 30*a* transmits session start instruction information to the destination terminal (the call terminal 10*da*) based on the IP address "1.3.2.3" of the destination terminal (the call terminal 10*da*) that was received in step S12. This session start instruction information is an instruction for the destination terminal (the call terminal 10*da*) to start the communication session. Moreover, at this time, the IP address "1.2.1.2" of the relay apparatus 30*a* is also transmitted.

S15: In this way, a first communication session sed1 is established between the requestor terminal (the call terminal 10*aa*) and the relay apparatus 30*a*.

S16: Moreover, a second communication session sed2 is established between the requestor terminal (the call terminal 10*da*) and the relay apparatus 30*a*.

Figure 17:
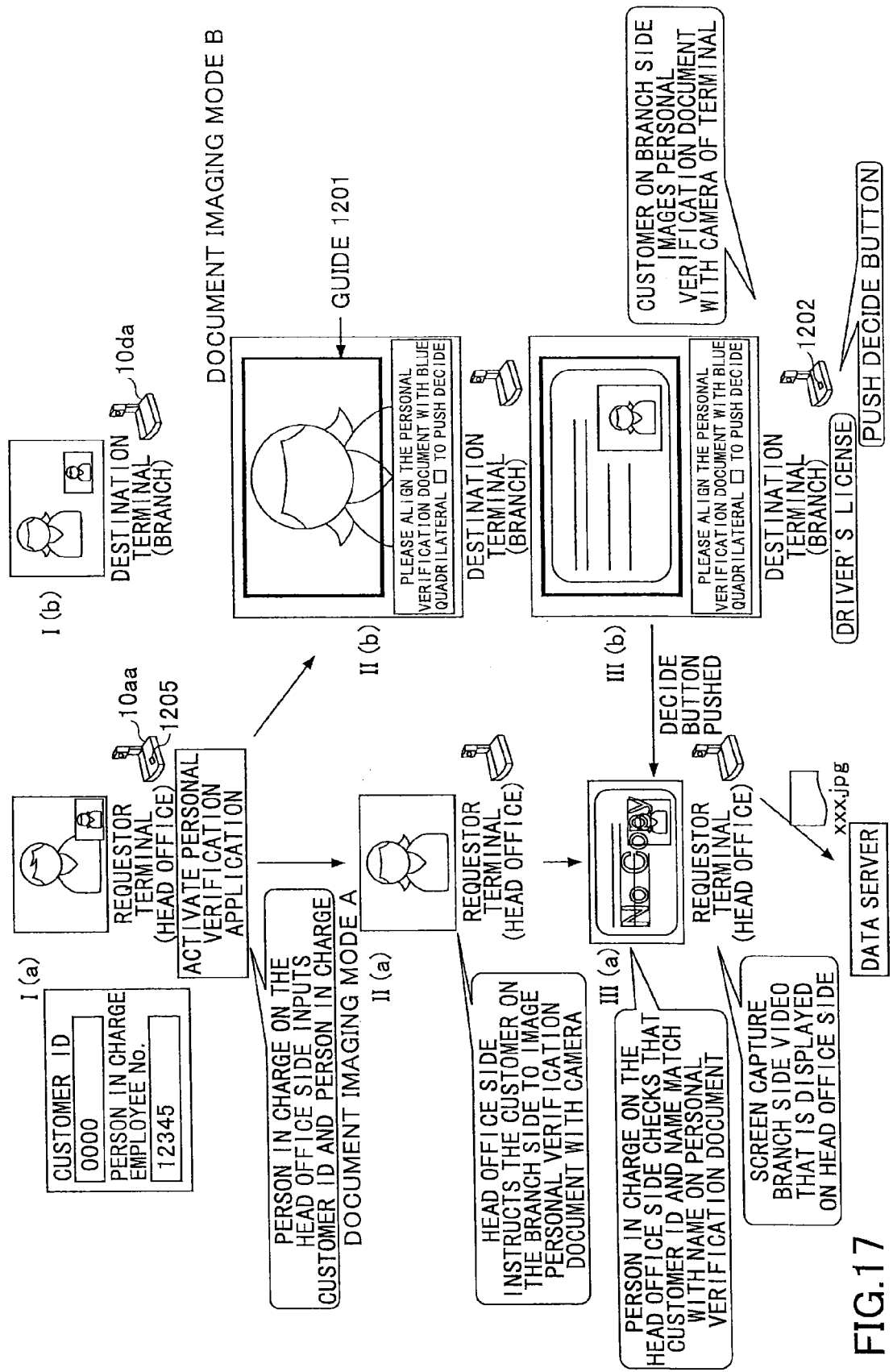
FIG. 17 is an exemplary diagram for schematically explaining registration of the screen shot of the personal verification document with the data server 80.

In this way, a call is started between the requestor terminal (the call terminal 10*aa*) and the destination terminal (the call terminal 10*da*), so that display screens as shown in I in FIG. 17 are displayed on a display 120 of the destination terminal (the call terminal 10*da*) and on the requestor terminal (the call terminal 10*aa*) side.

Permission to Capture Image Data of Personal Verification Document

A personal verification document is a document which can only be obtained and/or held by the person himself in principle and is a document which proves that whoever holds the document is probably the person himself. Generally, personal information of the person himself is described in the person verification document as personal verification information by which it may be confirmed that it is the person himself. The personal information includes the name, the birthdate, the current address, the temporary residence, the permanent domicile, a phone number, a photograph of the face, a vehicle number, a personal identification number.

Moreover, documents in which personal information is described include a driver's license, an insurance certificate, a passport, a certificate of residence, a copy of family register, etc. The personal information document may be a card instead of paper. Moreover, while the personal verification information is described as an example in the present Embodiment, it is not limited to the personal verification document, so that it may be arranged to require permission when the call terminal 10 captures image data of a document in which is described personal verification document by which it may be verified that it is the person himself.

Figure 16:
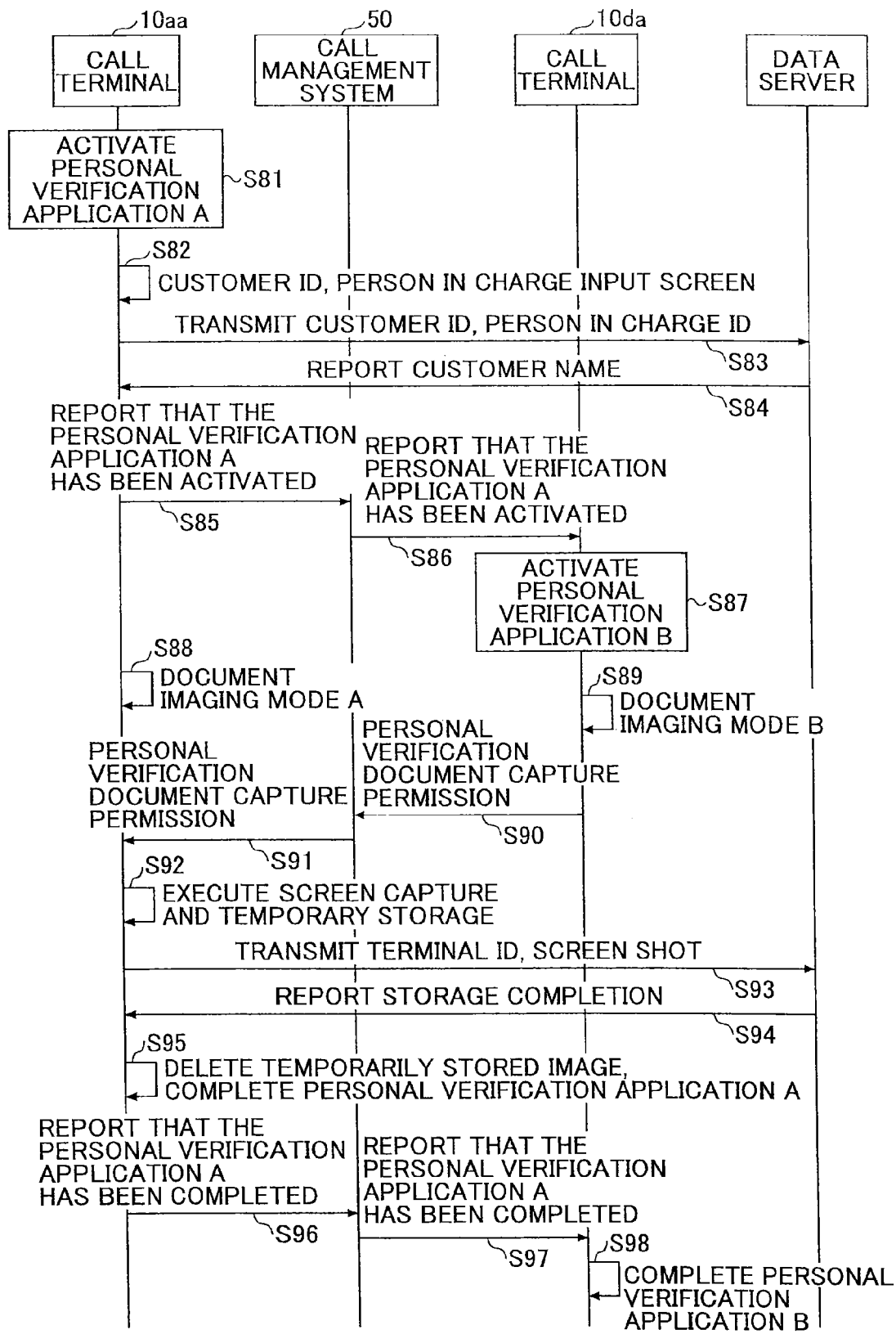
FIG. 16 is an exemplary sequence diagram for explaining a procedure for registering a screen shot of the personal verification document with a data server 80.

FIG. 16 is an exemplary sequence diagram for explaining a procedure for registering a screen shot of the personal verification document with the data server 80. FIG. 17 is an exemplary diagram for schematically explaining registration of the screen shot of the personal verification document with the data server 80.

As shown in I(a) and I(b) in FIG. 17, before capturing the display screens, the call terminals 10aa and 10da are in a regular conference mode. In the regular conference mode, which is a mode in which image data imaged by a camera of the respective call terminals conferencing are mutually transmitted and received, a person in charge or a customer may set up a layout of a display screen of the display 120. In the regular conference mode, layouts are possible as follows:

Full Screen (Counterpart Image) Mode

P and P mode (participating locations including the own location are arranged with the same size)

PinP mode (the own video is displayed in a small size on the lower right of the P and P mode, which does not include the own location)

Multi-view mode (With a counterpart video as a main one, video of the remaining locations (including the own location) is displayed on the right, bottom, and left sides thereof)

I(a) and I(b) in FIG. 17 are both PinP modes.

S81: The person in charge presses a predetermined button 1205 of the call terminal 10aa for activating the personal verification application A (for head office). In this way, the operation input acceptance unit 12 accepts an operation which activates the personal verification application A and the call terminal 10aa activates the personal verification application A. The personal verification application A may be activated by the person in charge selecting, not a predetermined button, but an icon thereof that is displayed on the display 120.

S82: The personal verification application A displays an input screen of the person in charge ID and the customer ID on the display 102. The operation input acceptance unit 12 accepts input of the person in charge ID and the customer ID and stores the accepted results in the storage unit 1000. The customer ID may be input by the customer, so that the call terminal 10aa may receive the input customer ID from the call terminal 10da.

S83: The personal verification application A transmits the person in charge ID and the customer ID to the data server 80. The customer ID is transmitted in order to acquire a customer name. If the customer name is known, the person in charge may input it in step S82. Moreover, the person in charge ID is transmitted to access the customer ID table of the person in charge. When the person in charge ID is reported to the data server 80, it may be reported by the person in charge logging in.

S84: The transmitting/receiving unit 81 of the data server 80 transmits, to the call terminal 10aa, the customer name associated with the customer ID from the customer ID table which is linked to the person in charge ID. The transmitting/receiving unit 11 of the call terminal 10aa receives the customer name.

S85: The personal verification application A reports, to the call management system 50 via the transmitting/receiving unit 11, that it has been activated.

S86: The transmitting/receiving unit 51 of the call management system 50 reports that the personal verification application A has been activated to the call terminal 10da, which is a counterpart terminal of the communication terminal 10aa that is registered in the session management table.

S87: The transmitting/receiving unit 11 of the call terminal 10da receives a report that the personal verification application A has been activated at the call terminal 10aa and the call terminal 10da activates the personal verification application B.

S88: The personal verification application A sets the call terminal 10aa to a document imaging mode A. As shown in II(a) in FIG. 17, in the document imaging mode A, the display control unit 16 displays, on the display 120 in full screen, image data transmitted from the call terminal 10da. The display screen cannot be captured until information indicating a permission to capture is transmitted from the call terminal 10da. In other words, the person verification application A and the call terminal 10aa do not include a user interface for capturing image data, such as a button. Even when the call terminal 10aa includes a user interface for capturing image data, such as a button, an operation of such a button is ignored when the personal verification application A is activated.

Moreover, the display control unit 16 provides an overlay display of the customer ID input by the person in charge and the customer name received from the data server 80 on the image data. In this way, the person in charge may grasp the customer name.

S89: When the personal verification application B is activated in the call terminal 10da, it sets the call terminal 10da to a document imaging mode B. As shown in II(b) in FIG. 16, in the document imaging mode B, the display control unit 16 displays an own video on the display 120da in full screen. Moreover, it displays a guide frame 1201 for providing a personal verification document. The personal verification document varies in size depending on the type thereof, so that the person in charge at the head office may provide the personal verification application B with the type of personal verification document (the driver's license, the insurance certificate, the passport, the certificate of residence, the copy of the family register) in order to display the guide frame 1201 in an appropriate size. The personal verification application A reports the type of the personal verification document or the size of the guide line to the personal verification application B, making it possible to display the guide frame 1201 appropriate for the size of the personal verification document.

Moreover, the personal verification application B displays a dialog which directs the personal verification document such as to image it with a camera connected to the call terminal 10da. In the dialog shown, it is displayed "please align the personal verification document with a blue quadrilateral to push the select button".

The customer on the call terminal 10da side images the personal verification document with a camera of the call terminal 10da. As shown in III(b) in FIG. 17, image data of the personal verification document are displayed in full screen in the display 120da of the call terminal 10da.

In this way, the transmitting and receiving unit 11 starts to transmit the image data of the personal verification document to the call terminal 10*aa*. The image data being transmitted does not mean that it is permitted for capturing. However, until the customer provides the permission, the display control unit of the call terminal 10*aa* applies an image process (indicating NoCopy, a mosaic process, a luminance reduction process, a contrast reduction process, etc., for example) to the image data of the personal verification document such as to cause the personal information to be no longer legible.

As shown in III(a) in FIG. 17, image data of the personal verification document are displayed in full screen in the display 120*aa* of the call terminal 10*aa*. However, the image data of the personal verification document cannot be captured until the customer permits. Moreover, with an indication of NoCopy, the personal information is not recorded even with imaging by a digital camera, etc.

S90: The person in charge at the head office views the image data of the personal verification document that are displayed on the display 120*aa* of the call terminal 10*aa* to check the imaging quality and requests the customer for permission to capture the screen shot, and, if permissible, instructs by voice to push the decide button (alternatively, a message requesting permission to capture it may be displayed on a dialog.) The customer at the call terminal 10*da* presses the decide button 1202. This pressing of the decide button 1202 corresponds to the permission to capture. The personal verification application B transmits, by the transmitting/receiving unit 11 to the call management system 50, the permission to capture and the image data of the personal verification document. The pressing of the decide button includes pressing the "hard" button, touching the decide button on a touch panel, clicking the decide button with a mouse, gesture inputting, a voice operation (for example, a voice confirmation of "permission to capture"), etc.

Therefore, the inquiry unit 18*b* of the present embodiment operates as follows:

When the person in charge requests permission to capture by voice, the inquiry unit 18*b* is not needed.

When the person in charge requests permission to capture on a dialog, pressing a button in the call terminal 10*aa* that is operated by the person in charge for displaying the dialog on the call terminal 10*da* becomes a trigger for the request for permission. Therefore, with pressing of the button that causes the dialog to be displayed, the inquiry unit 18*b* inquires the call terminal 10*da*.

When the personal verification application B is activated upon activating the personal verification application A, and the dialog for requesting the permission for capturing is automatically displayed by the personal verification application B, pressing of a predetermined button 1205 for the personal verification application A becomes a trigger for requesting permission. Therefore, with pressing of the predetermined button 1205, the inquiry unit 18*b* inquires the call terminal 10*da*.

S91: The call management system 50 transmits, to the call terminal 10*aa*, information indicating the permission to capture and the image data of the personal verification document to the call terminal 10*aa*.

S92: With pressing of the decide button of the call terminal 10*da*, the call terminal 10*aa* receives the information indicating the permission to capture, and the capture unit 14 of the call terminal 10*aa* captures the display screen displayed on the display 120*aa* to temporarily store the screen shot in an image storage DB 1001 of the call terminal 10*aa*. In other words, even when the person in charge does not operate at all, the capture unit 14 of the call terminal 10*aa* creates a screen shot on the display screen. It may also be arranged that, upon receiving the permission to capture, the personal verification application A may effectuate the creation operation of the screen shot in the call terminal 10*aa* for the person in charge to perform the creation operation to create the screen shot. The display control unit 16 does not perform the image process which causes the personal information to be no longer legible on image data transmitted with the information indicating the permission to capture. The capture unit 14 captures the image data, making it possible to store image data with personal information imaged in a superior manner.

S93: The temporarily stored screen shot is automatically transmitted to the data server 80 of the head office, together with the terminal ID. More specifically, the data registration unit 18*d* provides a predetermined file name to the screen shot stored in the image storage DB 1001 and transmits the provided results to the data server 80 by the transmitting/receiving unit 11. At the time of registration, the storage and reading processing unit 89 of the data server 80 links the screen shot to at least the terminal ID to register the linked results in the screen shot DB 8001. The registration is described below in detail.

S94: The data server 80 transmits the storage completion to the call terminal 10*aa*. It may also be arranged to have a procedure to transmit the screen shot from the call terminal 10*aa* to a designated printing machine and print the transmitted results, which procedure is described below.

S95: Upon receiving the report on the storage completion, the personal verification application A of the call terminal 10*aa* deletes the screen shot temporarily stored. The person in charge presses the predetermined button 1205 of the call terminal 10*aa* to complete the personal verification application A. Alternatively, it may be arranged for the person in charge to press a predetermined button 1205 of the call terminal 10*aa*, so that the personal verification application A is completed, and for the personal verification application A to delete the screen shot at the time of completion.

S96: The call terminal 10*aa* transmits to the call management system 50 that the personal verification application A has been completed. This transmission may be made by the personal verification application A immediately before completion of the application.

S97: The call management system 50 reports to the call terminal 10*da* that the personal verification application A has been completed.

S98: The personal verification application B of the call terminal 10*da* is automatically completed by a report that the personal verification application A has been completed. In other words, when the personal verification application B is being activated, the document imaging mode B cannot be completed from the call terminal 10*da*. In this way, completion of the personal verification application B due to an erroneous operation of the customer may be prevented. Moreover, when the personal verification application B is being activated, only the decide button 1202 can be pressed with the other keys being locked by the operation input acceptance unit 12 (an operation other than that of the decide button 1202 is ignored). In other words, when the personal verification application B is being activated, a process other than a transmission of image data of the personal verification document is prohibited.

When the call terminal 10*aa* and the call terminal 10*da* respectively complete the personal verification applications A and B, the call terminals 10*aa* and 10*db* return to the regular conference mode, returning to the layout (I(a) and I(b) in FIG. 17) before turning to the document imaging modes A and B.

In this way, it suffices for the customer transmitting image data of the personal verification document to just press the decide button with the personal verification document in alignment with the guide frame, so that even a customer who is not used to operating may easily transmit image data of the personal verification document. In other words, activation and completion of the personal verification application B, transmission process of the image data of the personal verification document, etc., are not required.

While the call terminal 10aa stores a still image as image data in the present Embodiment, it may be arranged to store a video in which the personal verification document is imaged. Moreover, at this time, it may be arranged for data of voice provided on the customer side to be the information indicating the permission for capturing the personal verification document. In other words, image data and voice data in which the customer makes a vocal confirmation "agrees to storing the driver's license", etc., are saved. In this case, even when the decide button is pressed on the side of the person in charge, the image data and the voice data may be set to be records of the information indicating that the capture is to be permitted. Moreover, performing voice recognition and transmitting the information indicating the permission to capture to the call terminal 10aa by the call management system 50 makes it possible to make pressing of the decide button 1202 unnecessary.

Moreover, while the call terminals 10aa and 10da communicate via the call management system 50 in FIG. 16, the call terminals 10aa and 10da may directly communicate with the call management system 50 not intervening, or with minimal intervention of the call management system 50.

Registration in Data Server

Registration in the data server 80 of step S93 in FIG. 16 is described. While it is described in FIG. 16 that the screen shot is automatically registered in the data server, it may be arranged for making it possible to select, by an operation of the person in charge, registration in the data server, or printing, or not doing anything.

Figure 18:
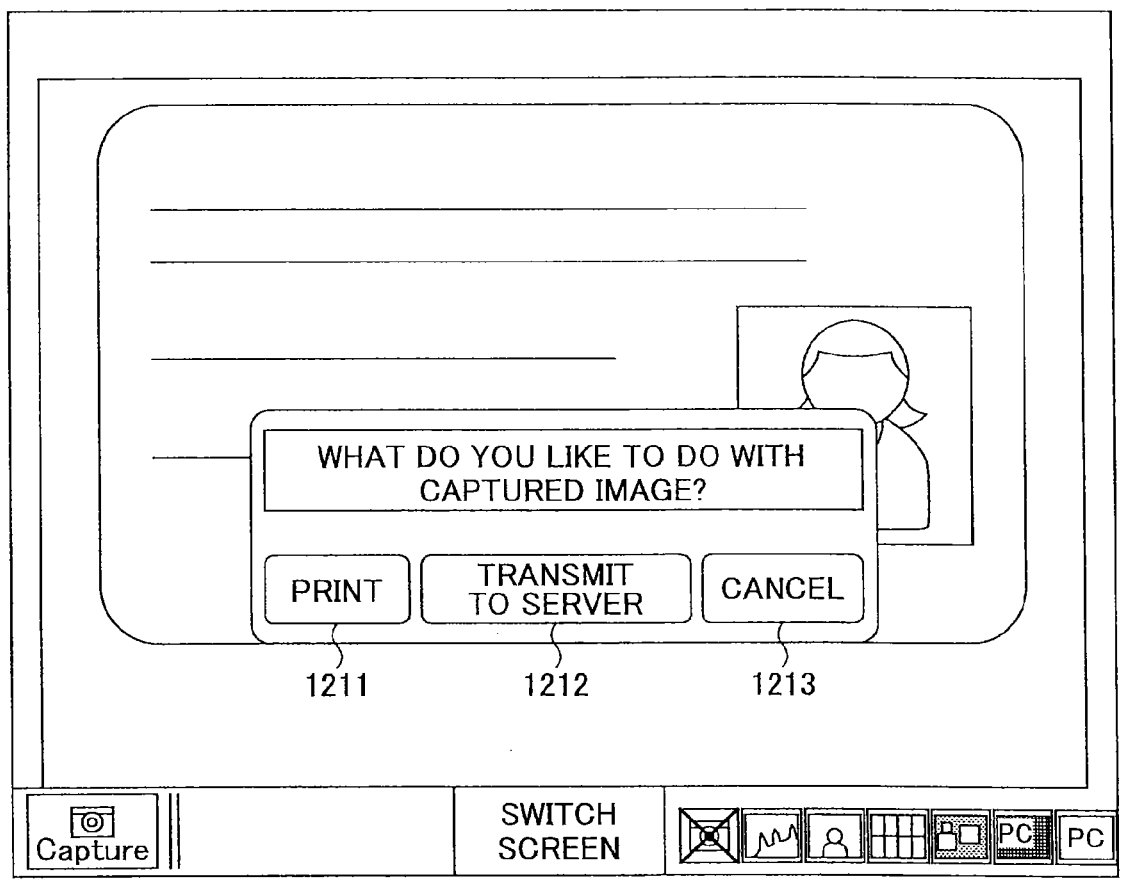
FIG. 18 is a diagram illustrating one example of a process selection screen displayed on a display.

FIG. 18 is a diagram illustrating one example of a process selection screen which is displayed on the display 120 of the call terminal 10aa. On the process selection screen are displayed a message "What would you like to do with the captured image?"; a "print" button 1211; a "transmit to server" button 1212; and a "cancel" button 1213. The person in charge selects any one of the buttons by clicking it with a mouse or touching it.

Figure 19:
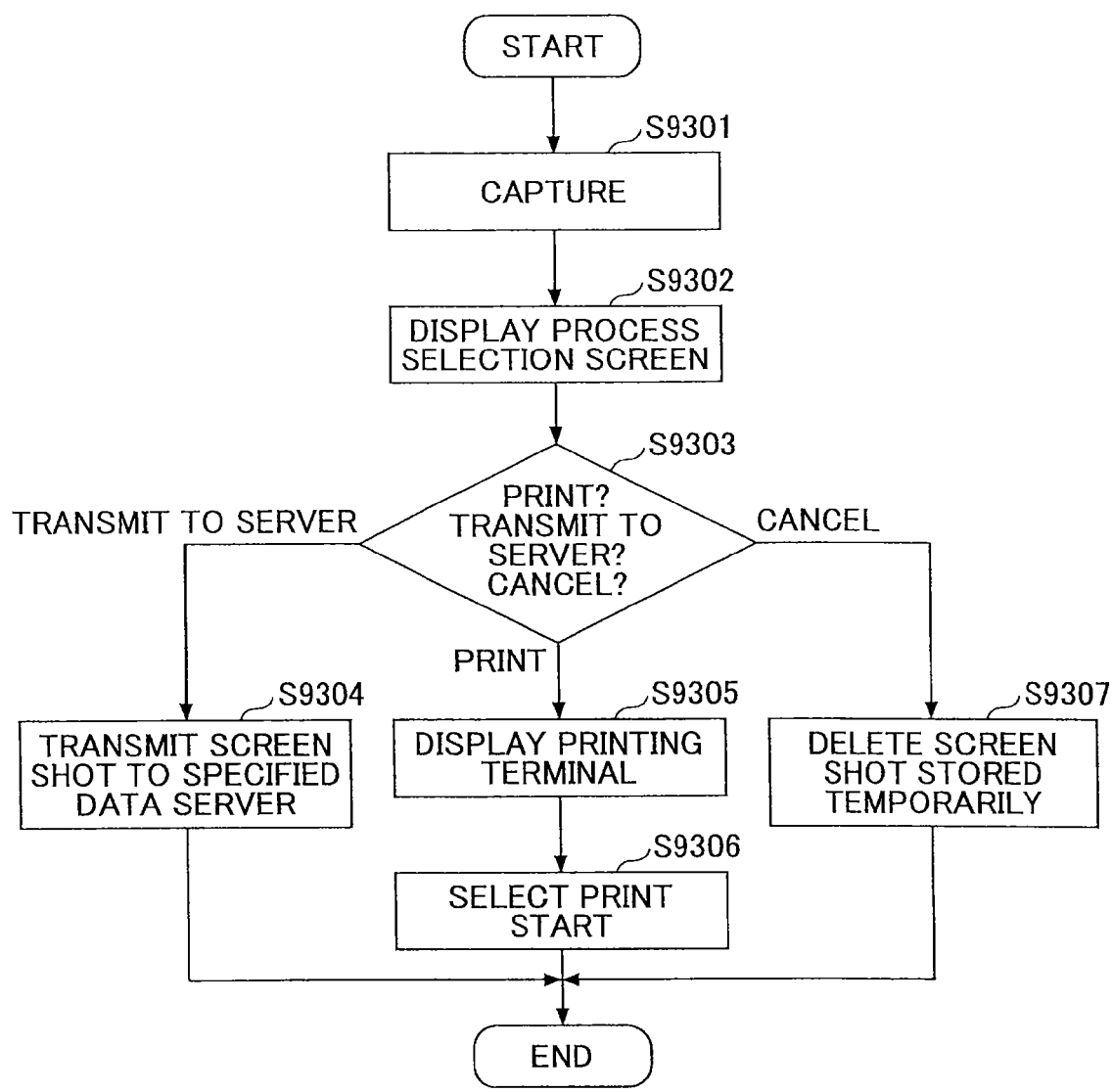
FIG. 19 is an exemplary flowchart for explaining a procedure for the call terminal to process a screen shot.

FIG. 19 is an exemplary flowchart for explaining a procedure for the call terminal 10aa to process a screen shot.

As described previously, the personal verification application A captures the personal verification document (S9301).

The personal verification application A displays a process selection screen as shown in FIG. 18 on the display 120 (S9302).

The personal verification application A determines which operation of "print", "transmit to server", or "cancel" was accepted by the operation input acceptance unit 12 (S9303).

When the transmit to server button 1212 is selected, the personal verification application A transmits the screen shot to the data server 80 via the communication network 2 from the call terminal 10aa (S9304). The transmitted screen shot is deleted from the call terminal 10aa.

When the print button 1211 is selected, the display control unit displays a printer list screen (not shown) (S9305). In the printer list screen, a list of printable printing terminals 20 registered with destination list information 1003 is displayed. The printed screen shot is deleted from the call terminal 10aa.

The personal verification application A transmits the screen shot to the printing terminal 20 selected by the person in charge (S9306). The printing procedure is described in Embodiment 3.

When the cancel button 1213 is selected, the personal verification application A deletes the screen shot temporarily stored in the image storage DB 1001 (S9307).

Figure 20:
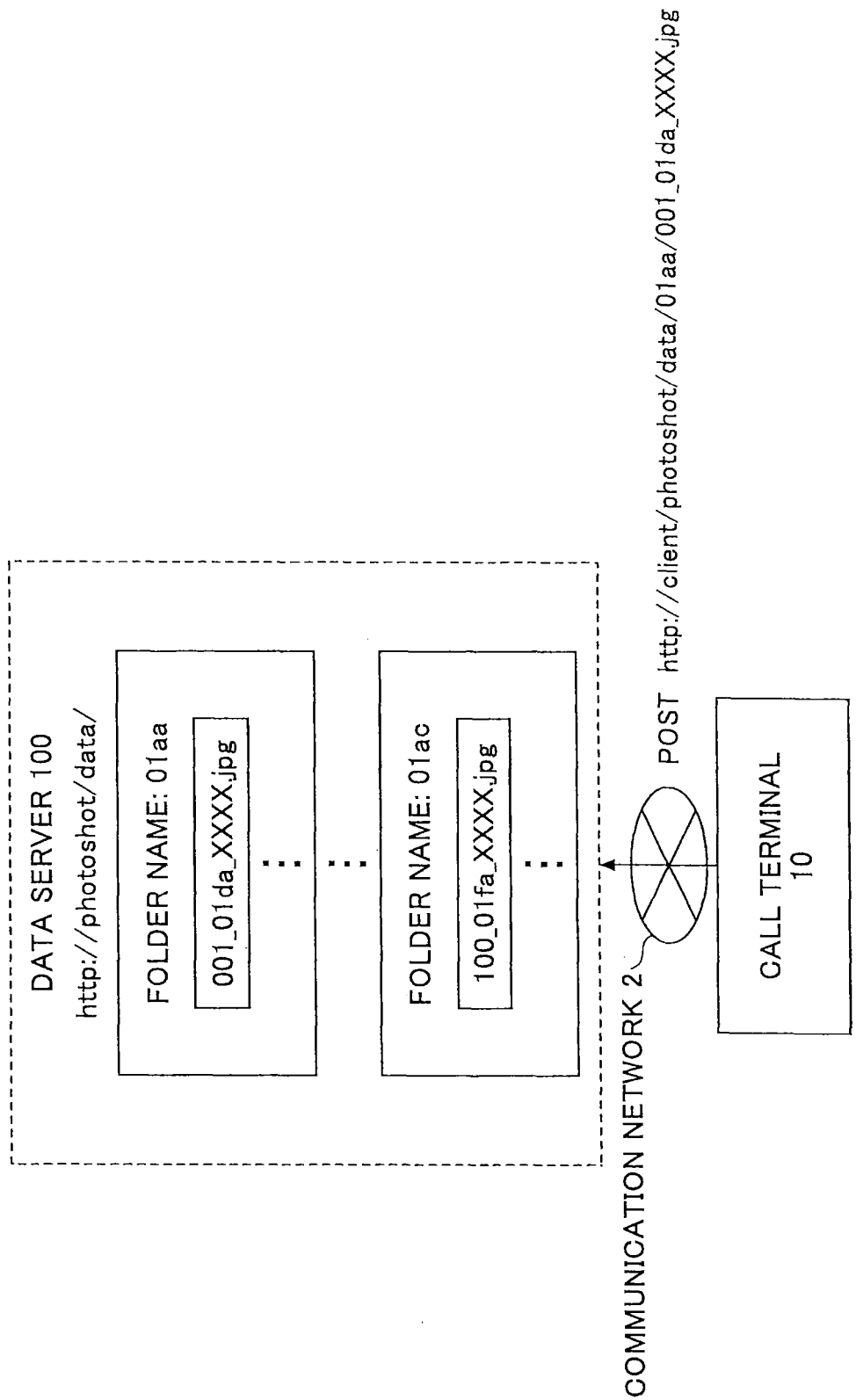
FIG. 20 is an exemplary diagram for schematically explaining registration of the screen shot from the call terminal to the data server.

FIG. 20 is an exemplary diagram for schematically explaining registration of the screen shot from the call terminal 10aa to the data server 80.

A data registration 18d of the call terminal 10aa transmits the screen shot to the data server 80. The data registration unit 18d transmits a screen shot file (001_01da_XXXX.jpg) with an HTTP POST command, for example.

The data registration unit 18d gives a file name to the screen shot to be transmitted. The screen shot file name is generated so as to include a character sequence of "a customer ID", "a terminal ID" and "a date". The customer ID is what the person in charge inputs into the call terminal 10aa with an input screen of I(a) in FIG. 17, the terminal ID is a terminal ID of the call terminal 10 which transmitted image data of the personal verification document, and the date is obtained from a clock embedded in the call terminal.

For example, the terminal ID of the call terminal operated by a customer with the customer ID="001" is "01da". When the image data of the personal verification document transmitted from the terminal ID "01da" is captured at "2012/7/7 14:50 23 seconds", the file name of the screen shot is "001_01da_20120707145023Extension".

When the transmitting/receiving unit 41 of the data server 80 receives the screen shot, the storage and reading processing unit 89 stores the received results in the storage unit 8000. In the storage unit 8000, a folder (or a directory) is created for each call terminal. In other words, the storage and reading processing unit 89 stores the transmitted screen shot in a dedicated folder having, as a file name, the terminal ID of the transmitting terminal. While the folder name and the terminal ID match in FIG. 20, they do not have to match as long as the folder and the call terminal are linked. The terminal ID of the call terminal 10 and the date information may be held as metadata or tag data of the file, instead of including them in a file name. Moreover, the file name may be given by the data server 80.

The data server 80 may conduct control such as permitting viewing of the screen shot by only the call terminal which stored the screen shot, permitting browsing of the screen shot for a certain period, etc. For example, the viewing control unit 82 requests a terminal ID and a password from the call terminal, and permits an access when there is a match with a terminal ID and a password that are registered in the terminal authentication management table of the terminal authentication management DB 5002. Then, the storage and reading processing unit 89 restricts a folder accessible by the call terminal 10aa to only a folder with a folder name of "01ga".

Viewing of Screen Shot and Document Data

Figure 21:
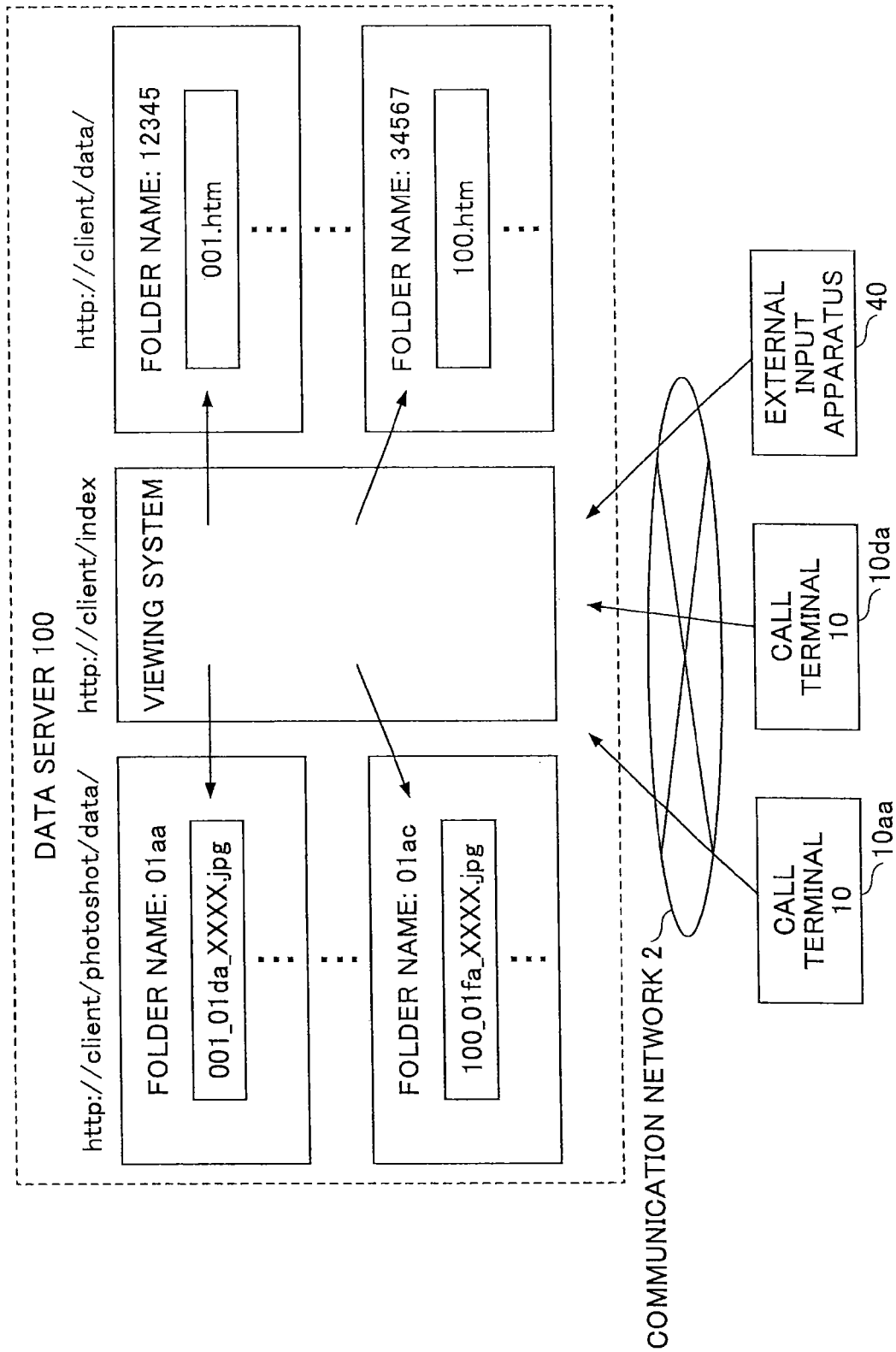
FIG. 21 is one example of a diagram for explaining, in the call system, a system configuration when the call terminal, etc., views the screen shot.

FIG. 21 is one example of a diagram for explaining, in the call system, a system configuration when the call terminal 10, etc., views the screen shot. A viewing unit 18e of the call terminal 10, which is a browser function, for example, accesses a URL "http://client/index", which is designated by the person in charge. When a log-in screen here is opened to log in, a web page is displayed in which the customer DB 8002, the screen shot DB 8001, and the document data DB 8003 can be accessed.

When the viewing unit 18e accesses the screen shot DB 8001 from this Web page, the viewing control unit 82 of the data server 80 receives the terminal ID "01aa" from the call terminal 10aa. The storage and reading processing unit 89 first specifies a folder called 01aa, and searches for a screen shot having the input terminal ID in a file name from the folder. The transmitting/receiving unit 81 of the data server 80 transmits a screen shot meeting the search to the call terminal 10aa. The customer ID table is stored in a folder having a terminal ID as the folder name, or in a folder having a person in charge ID as the folder name.

Moreover, when a generic information processing apparatus such as a PC accesses the data server 80, the data server 80 restricts a folder which may be accessed, in accordance with the privilege of the person in charge which operates the PC. The person in charge links the user ID, the terminal ID, and the access privilege to register the linked results with the data server 80 in advance. The access privileges may be "general", "administrator", etc.; the person in charge with the general access privilege may only access a folder with a terminal ID which is linked to the user ID. The administrator may access an arbitrary folder, for example.

The data server 80 may encrypt a screen shot of each folder with a key generated from a folder name (a terminal ID). In this way, even when the data server 80 is intruded from outside, it may be arranged to make it difficult for the personal verification document to be leaked since the terminal ID differs for each folder. Moreover, even when the terminal ID is specified, the data may not be decrypted if a method of generating a key is not known; therefore, it may be arranged to make it even more difficult for it to be leaked.

Customer Information Listing Screen

Next, displaying of customer information listing screen is described. The person in charge accesses an URL "http://client/index" dedicated to the person in charge and logs in. After logging in, the person in charge transmits a request to create the customer information listing screen to the data server 80, which creates the customer information listing screen with HTML, etc., and transmits the created results to the call terminal 10aa.

Figure 22:
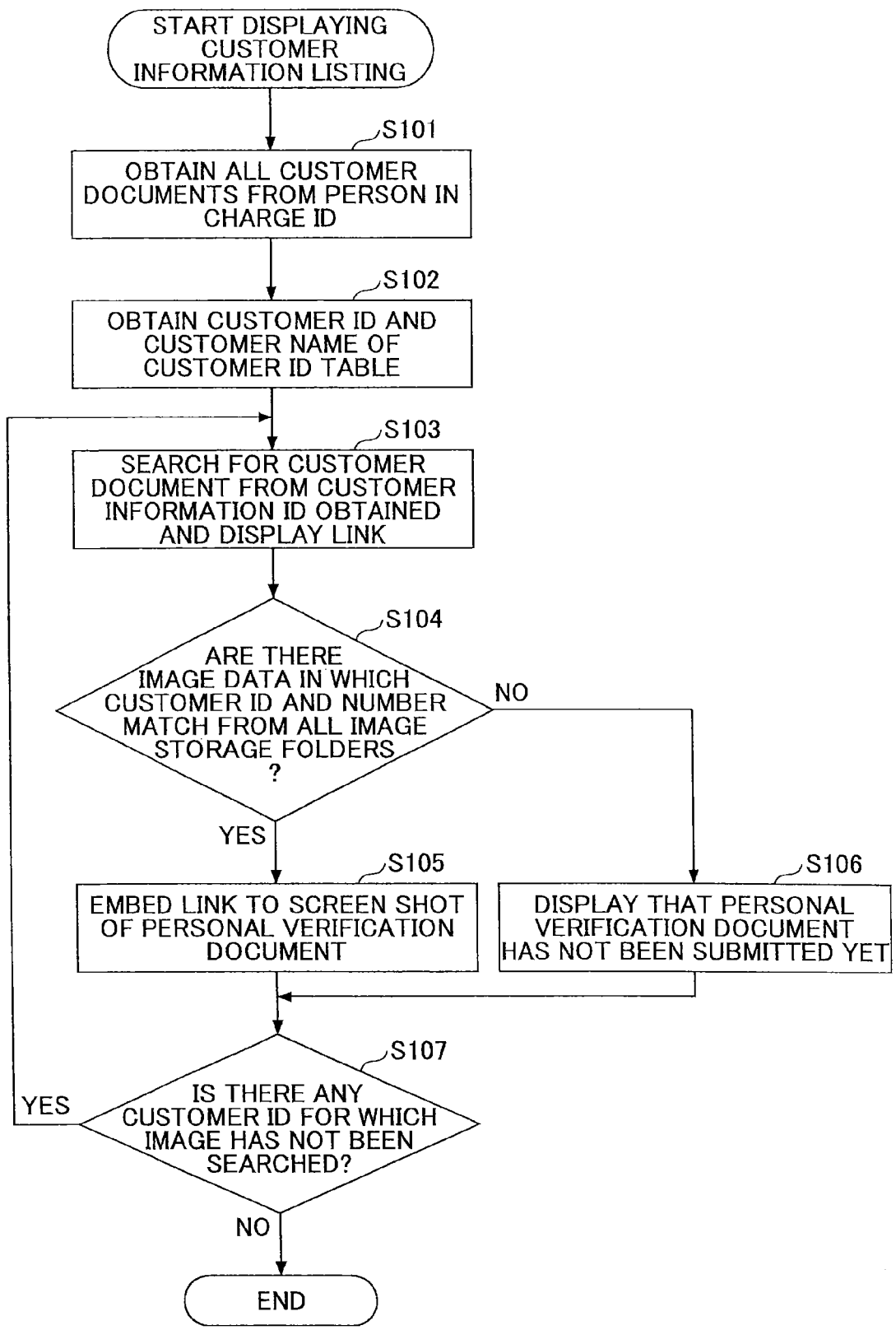
FIG. 22 is an exemplary flowchart indicating a procedure for the data server creating a customer information listing screen.

FIG. 22 is an exemplary flowchart indicating a procedure for the data server 80 creating a customer information listing screen. Upon a request to create the customer information listing screen (or at least by the request to create), the call terminal 10aa transmits, to the data server 80, a terminal ID of the call terminal 10 used by the person in charge and the person in charge ID.

First, the screen creation unit 83 obtains a file name for all document data sets from a folder having the person in charge ID of the document data DB 8003 as the folder name (S101).

Next, all customer IDs and customer names are obtained from the customer ID table (S102). If the customer name is not required, the customer ID may be extracted from the file name of the document data of the document data DB 8003, in which case the customer ID table does not have to be referred to.

The screen creation unit 83 links the file name of the document data obtained in step S101 to the customer name and the customer ID obtained in step S102 and embeds a link to the document data in a file name of the document data (S103). The customer ID is known from the customer ID table and the file name of the document data includes the customer ID, so that they can be linked easily. Moreover, when the document data is "001.htm", the link may be, "http://client/data/12345/001.htm", for example.

The process below is performed for each customer ID. It is determined whether a screen shot having the customer ID as a file name is present in a folder having the terminal ID of the call terminal 10aa of the screen shot DB 8001 as the folder name (S104).

When the screen shot having the customer ID as the file name is not present (No in S104), the screen creation unit 83 creates screen data which display that the personal verification document for the customer ID in question has not been submitted yet (S106).

If the screen shot having the customer ID as the file name is present (Yes in S104), the file name of the screen shot is linked to the customer ID in question (S105). The screen creation unit 83 embeds a link (for example, http://client/photoshot/01aa/001_01da_XXXX.jpg) to the screen shot in the file name of the screen shot.

Next, the screen creation unit 83 determines whether presence/absence of the screen shot has been determined for all customer IDs obtained in step S102 (S107).

When the presence/absence of the screen shot has been determined for all the customer IDs, the process in FIG. 22 is completed. In this way, the screen creation unit 83 creates screen data which have, as one record, a screen shot of the person verification document including the link; the document data including the link; the customer name; and the customer ID for all the customer IDs in the customer ID table.

The screen creation unit 83 may create the screen data in advance at the time of registering the screen shot or the document data, or when processing load is low, for example, rather than creating screen data at the time of receiving a request from the customer.

FIG. 23 is a diagram illustrating an example of the customer information listing screen.

On the customer information listing screen, the file name of the screen shot of the personal verification document; the file name of the document data; the customer ID; and the customer name are displayed for each record. The customer name and the customer ID are the same as those registered in the customer ID table. The file name of the document data are obtained from the document data DB 8003 in step S103. The file name of the screen shot of the personal verification document is what is obtained from the screen shot DB in S104. When the personal verification document has not been submitted yet, "Not yet" is displayed for the file name of the screen shot of the personal verification document.

In this way, the person in charge using the call terminal 10aa to register the screen shot of the personal verification document in the data server 80 makes it possible to provide a listing display in association with the document data of the customer. Moreover, when the screen shot has not been registered, "not yet" is displayed as information indicating that it has not been registered, the person in charge may check that the personal verification document has not been registered yet.

A link to the file of the data server 80 is embedded in a file name of the screen shot of the personal verification document and the file name of the document data. The link to the file embedded in the file name is one example of first access information in the claims. Therefore, the person in charge may select the personal verification document with a mouse, etc., for the call terminal 10aa to access a link destination to download a screen shot of the personal verification document or the document data.

Figure 24:
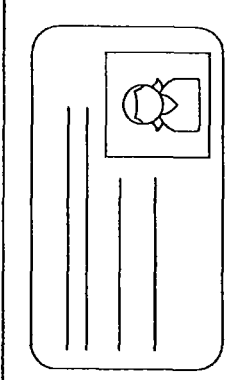
FIG. 24 is a diagram illustrating an example of a document data display screen.

FIG. 24 is a diagram illustrating an example of the document data display screen. When the person in charge select a file name of the document data with a mouse, etc., the screen of the document data in FIG. 24 is displayed. When the person in charge selects the document data, the viewing unit 18e sends a request "/client/data/12345/001.html" to the data server 80 with an HTTP request message (GET command). The screen creation unit 83 transmits "001.html" to the call terminal 10aa.

This "001.html" has a description of the image tag as follows: <imgsrc=" . . . /client/photoshot/data/01aa/001_01da_20120707145023.jpg "width="300" height="200" border="2" alt="personal verification document">

This is a description to display a screen shot of 001_01da_20120707145023.jpg (customer ID-001) at a location specified in the document data. Thus, upon searching for an image tag, the viewing unit 18e requests image data described in "src=" from the data server 80. In this way, the viewing unit 18e synthesizes and displays the received screen shot at a location specified with an image tag. The description of this image tag is one example of the second access information in the claims.

When the screen shot is not registered in the data server 80, a letter of "personal verification document" described with "alt=" instead of the screen shot is displayed.

In this way, the call system of the present embodiment may separately register the document data and the screen shot with appropriate file names in the data server 80 to synthesize and display the screen shot of the document data. Moreover, when the screen shot is requested, only the screen shot may be displayed.

The screen shot may be synthesized in the document data as follows: Assume that "001.html" has a description of the image tag as follows: <img src=" . . . /client/photoshot/data/dummy.jpg "width="300" height="200" border="2" alt="personal verification document">

The viewing unit 18e requests dummy.jpg stated in an image tag from the data server 80. The screen creation unit 83 of the data server 80 may specify the customer ID "001" from a file name of the document data of "001.htm". Moreover, the call terminal 10aa transmits the terminal ID (01aa) of the own location to the data server 80, making it possible to specify searching for a file of a screen shot including the customer ID "001" from a " . . . /client/photoshot/data/01aa" folder. The screen creation unit 83 changes the file name of "001_01da_20120707145023.jpg" with dummy.jpg to transmit the changed results to the call terminal 10aa. In this way, the viewing unit 18e combines dummy.jpg to the document data to display the combined results. In this example, the description of the image tag does not have to be matched with the file name of the screen shot, so that it is not necessary for the system administrator, etc., to edit the document data after the screen shot is registered and the file name thereof is determined.

As described above, the call system of the present embodiment may register the image data of the personal verification document with the data server 80 to easily link the registered results with the document data of the customer. Moreover, the person in charge may easily check that the personal verification document has not been registered.

The modes of the present Embodiments do not limit the scope of the present invention, so, needless to say, there are various system configuration examples depending on the use and objectives. For example, the call management system and the data server 80 may be arranged as one information processing apparatus. Moreover, the printing terminal 20 may include functions of the call management system 50 and the data server 80.

Moreover, the functions included in the call management system 50 may be included in multiple information processing apparatuses in a distributed manner, while the functions included in the data server 80 may be included in multiple information processing apparatuses.

Moreover, the destination list creation unit 18a of the call terminal 10 may be included in the call management system 50, the data server 80, or the call terminal 10. It is not necessary for the other functions included in the call terminal 10 to be embedded in the call terminal, so that the call terminal may call and use them.

Moreover, the storage unit 5000 included in the communication management system 50 may be on a network accessible by the call management system 50; the storage unit 8000 included in the data server 80 may be on a network accessible by the data server 80; the storage unit 2000 included in the printing terminal 20 may be on a network accessible by the printing terminal 20; and the call terminal 100 may be on a network accessible by the call terminal 10.

Embodiment 2

In Embodiment 1, as shown in FIG. 24, the personal verification document may be combined with the document data to display the combined results on the document data display screen. In the present Embodiment, a call system in which a document data display screen may be shared with a counterpart terminal is described.

Figure 25:
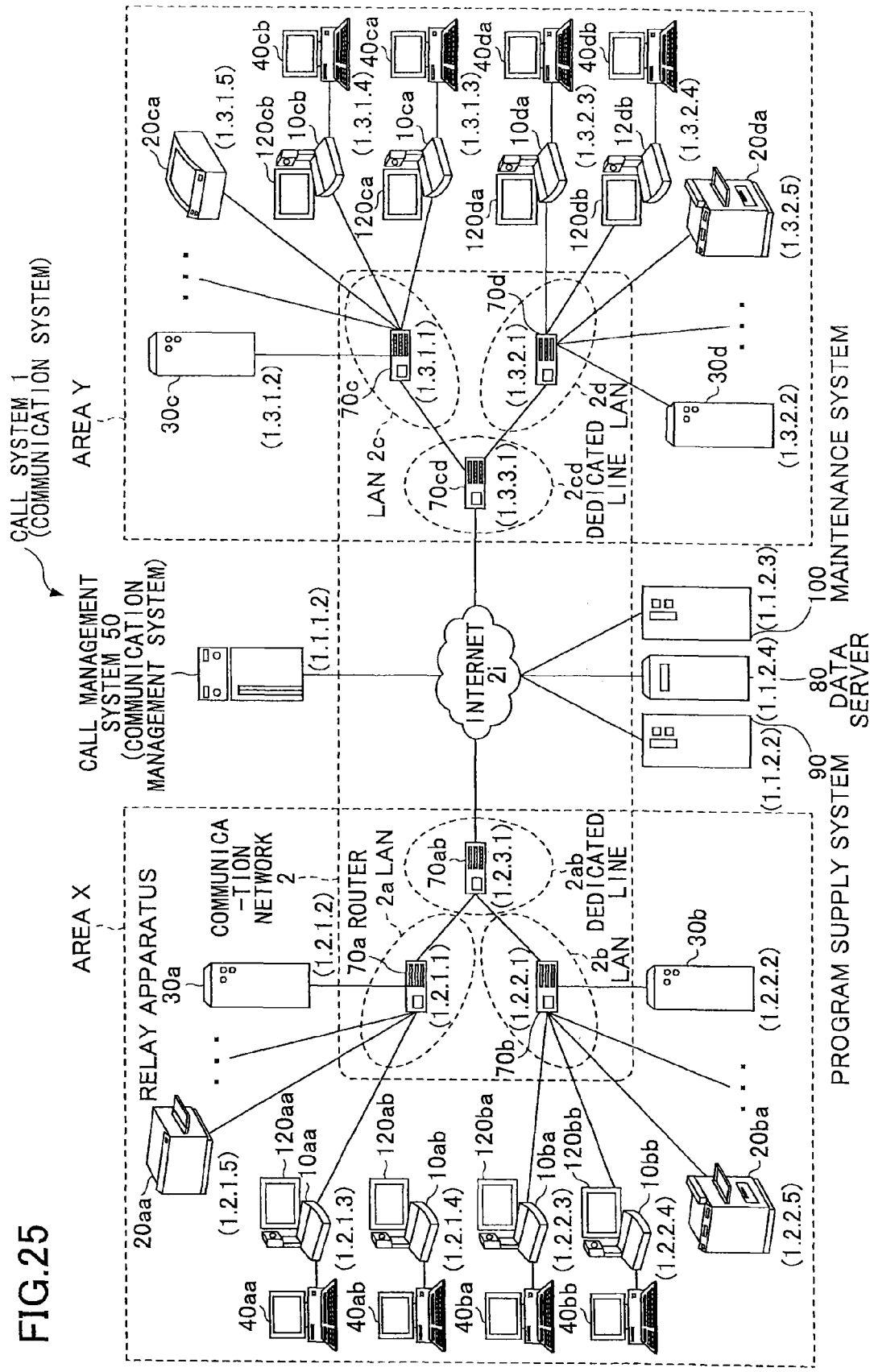
FIG. 25 is a schematic diagram of a call system according to one Embodiment (Embodiment 2) of the present invention.

FIG. 25 is a schematic diagram of a call system according to one embodiment of the present invention. In FIG. 25, external input apparatuses 40aa, 40ab, 40ba, 40bb, 40ca, 40cb, 40da, and 40db such as a PC, etc., are connected to multiple call terminals (10aa, 10ab, . . . , 10db).

The external input apparatus 40 is arranged to be connected to the call terminal 10 to transmit, to the call terminal 10, display data showing an image displayed on a display apparatus (below-described display 508) of the external input apparatus 40. The external input apparatus 40 and the call terminal 10 are connected by an USE cable, an LAN cable, etc., for example. They may also be connected by wireless such as Bluetooth (registered trademark), wireless LAN, infra-red, IC communication, etc.

The external input apparatus 40 has the same hardware configuration as the call management system 50, so that the explanation thereof is omitted. Programs for an external input apparatus that are for controlling the external input apparatus 40 are stored in the ROM 502. In this case, the programs for the external input apparatus may be recorded on a recording medium which is readable by a computer, such as a CD-ROM 513, the recording medium 506, etc., and distributed in a file having an installable or executable format.

Figure 26:
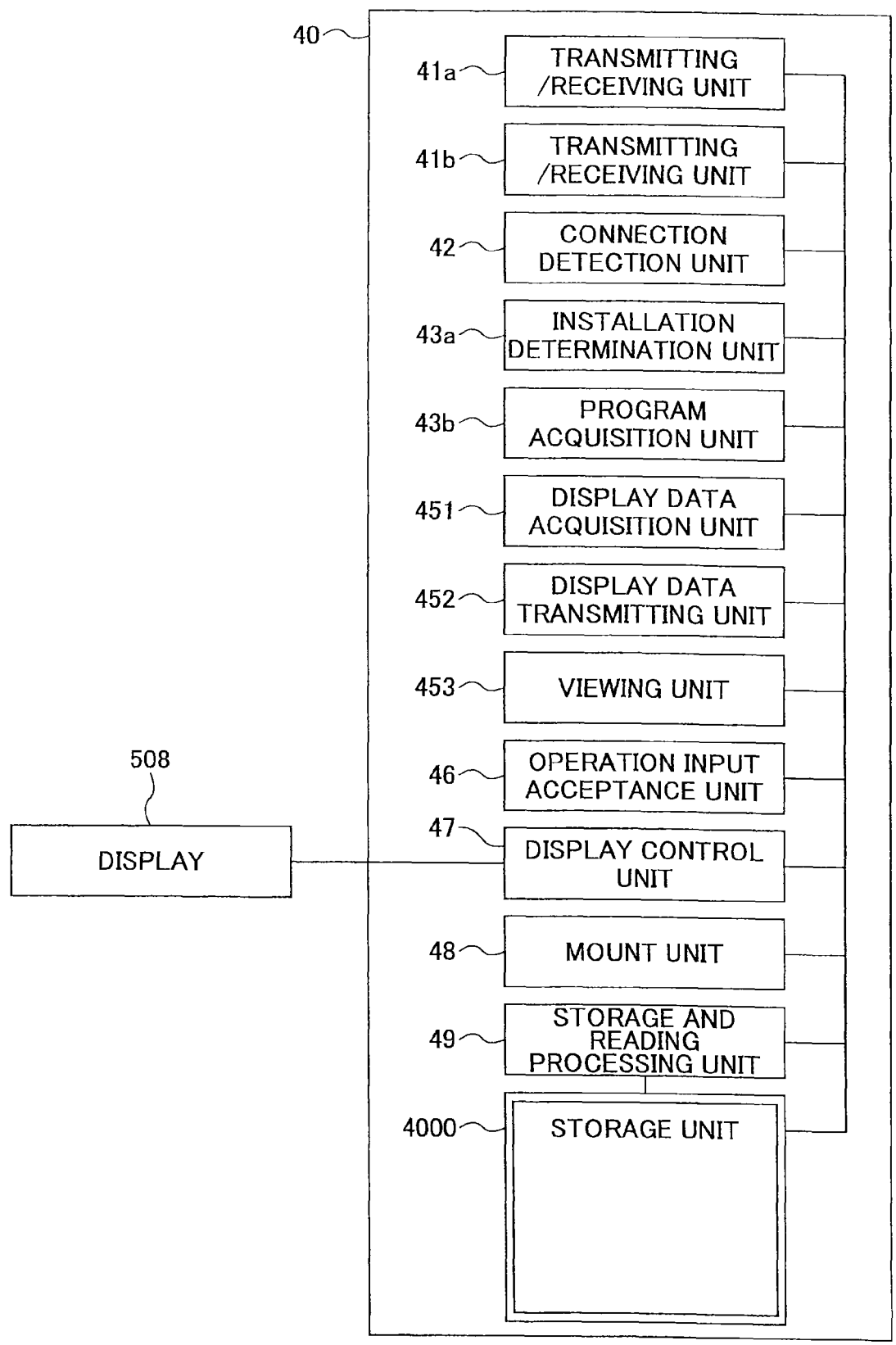
FIG. 26 is an exemplary functional block diagram of an external input apparatus.

Next, based on FIG. 26, the respective functional units of the external input apparatus 40 are described in detail. FIG. 26 is an exemplary functional block diagram of the external input apparatus 40. First, a transmitting/receiving unit 41a, which is realized by the network I/F 509 shown in FIG. 5, transmits and receives various data (information) from/to the call terminal 10. The transmitting/receiving unit 41a communicates with the call terminal 10 to transmit and receive various data.

A transmitting/receiving unit 41*b*, which is realized by the network I/F 509, transmits and receives various data (information) from/to the data server 80 via the communication network 2.

A connection detection unit 42 detects that transmission and reception of various data from/to the call terminal 10 have been enabled and the call terminal 10 has been connected by the external apparatus I/F as shown in FIG. 3.

An installation determination unit 43*a* determines whether programs 25 for external input apparatus have been installed in the external input apparatus 40. If not installed, a program acquisition unit 43*b* installs the programs 25 for external input apparatus from the storage unit 1000 of the call terminal mounted by a mount unit 48 via a terminal communication unit 41. An operation input acceptance unit 46 accepts information input by an operation of a user. A display control unit 47 displays a below-described screen share button 301 on the display 508.

A display data acquisition unit 451 acquires display data of an image displayed on the display 508 of the external input apparatus 40. A display data transmitting unit 452 transmits the display data acquired by the display data acquisition unit 451 to the call terminal 10 via the transmitting/receiving unit 41*a*.

In the same manner as the viewing unit 18*e* included in the call terminal 10 of Embodiment 1, a viewing unit 453 communicates with the data server 80 via the transmitting/receiving unit 41*b* and displays customer information listing screen and document data display screen on the display 508.

The mount unit 48 has mounted the storage unit 1000 of the call terminal 10. This makes it possible for the external input apparatus 40 to install programs for an external input apparatus. Moreover, the programs for the external input apparatus that are obtained from the call terminal 10 may be developed, without installation, into the RAM 203 to execute the developed results.

A storage and reading processing unit 49, which is executed by the HDD 505 shown in FIG. 5, conducts a process of storing various data to the storage unit 4000 and reads various data stored in the storage unit 4000.

Data Server

In addition to the same functions in Embodiment 1, the functions of the data server 80 include, in the storage unit 8000, a person in charge terminal DB including a person in charge terminal table.

Figures 27, 28:
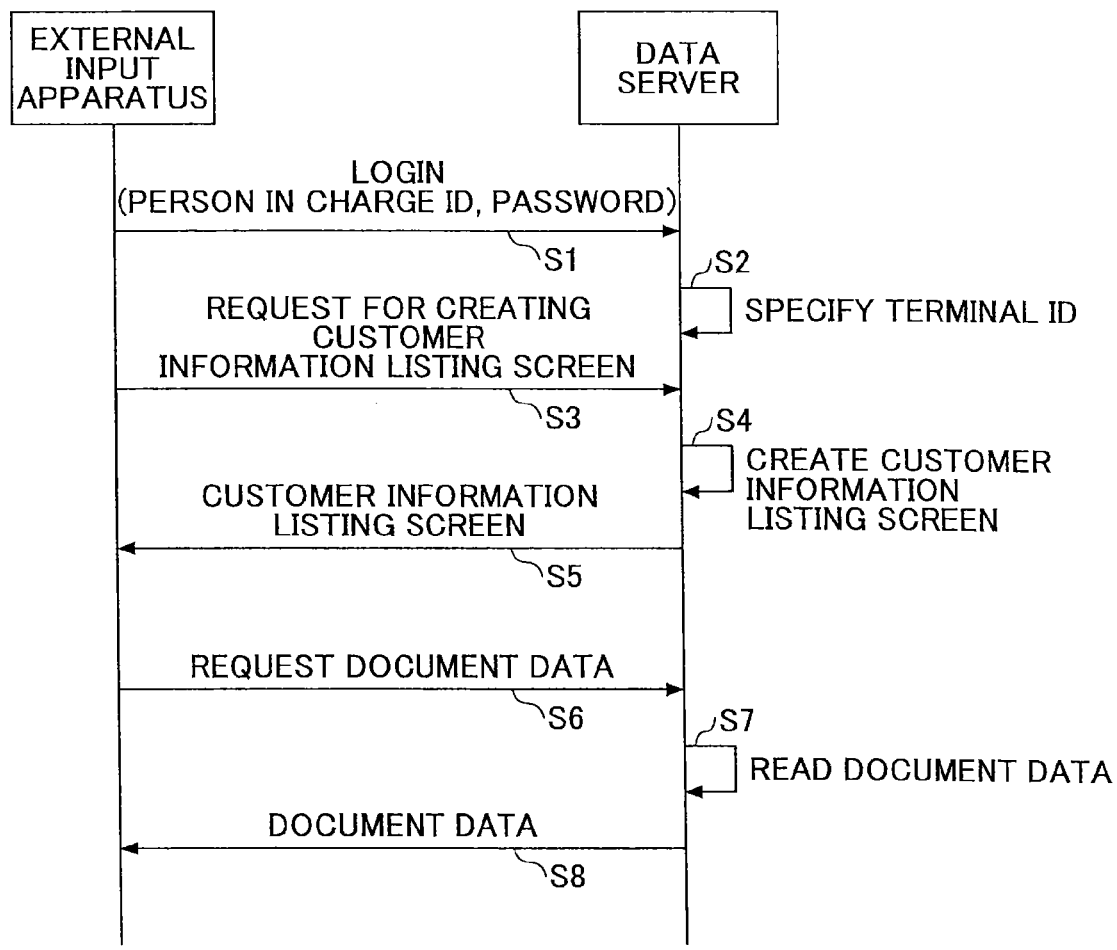
FIG. 27 is a diagram illustrating an example of a person in charge terminal DB.
FIG. 28 is one example of a sequence diagram illustrating a procedure for the external input apparatus to display a customer information listing screen, etc., on a display 508.

FIG. 27 is a diagram illustrating an example of the person in charge terminal DB. In the person in charge terminal table, the terminal ID of a usable terminal and the person in charge ID are linked. It is registered that the respective persons in charge use the call terminals of the terminal IDs of the usable terminals registered in the person in charge terminal table. The person in charge may access, by the external input apparatus 40, only the screen shot registered by the call terminal 10 of the terminal ID of the usable terminal. Multiple or all of the terminal IDs can be linked to the person in charge ID depending on the privilege of the person in charge to perform access control according to the privilege.

Display of customer information listing screen and document data display screen by external input apparatus The external input apparatus 40 may display the customer information listing screen and the document data display screen on the display 508 in the same manner as the call terminal 10.

FIG. 28 is one example of a sequence diagram illustrating a procedure for the external input apparatus to display a customer information listing screen, etc., on the display 508.

S1: The person operates the external input apparatus 40 to log in to the data server 80. The operation input acceptance unit 46 accepts the login operation, and the transmitting/receiving unit 41*b* transmits the person in charge ID and the password to the data server 80.

S2: The transmitter/receiver 81 of the data server 80 receives the terminal ID and the password. When the authentication is realized, the data server 80 specifies the terminal ID linked to the person in charge ID of the person in charge terminal table. This makes it possible to read a screen shot from a folder having the terminal ID as the folder name. The person in charge may transmit the terminal ID to the data server.

S3: Next, when the person in charge operates the external input apparatus 40, the viewing unit 453 transmits a request for creating the customer information listing screen. While the customer ID of the customer handled by the person in charge may be determined from the person in charge ID, the person in charge, as needed, may transmit the customer ID of an arbitrary customer handled by the person in charge.

S4: The viewing control unit 82 of the data server 80 receives the request for creating the customer information listing screen via the transmitting/receiving unit 81, and the screen creation unit 83 creates the screen information listing screen. The creation procedure may be the same as the flowchart in FIG. 22.

S5: The transmitting/receiving unit 81 of the data server 80 transmits the customer information listing screen to the external input apparatus 40. In this way, the viewing unit 453 of the external input apparatus 40 displays the customer information listing screen shown in FIG. 23 on the display 508.

S6: The person in charge selects document data of the customer information listing screen to request the document data to the data server 80.

S7: The viewing control unit 82 of the data server 80 receives the request for the document data via the transmitting/receiving unit 81, and the screen creating unit 83 reads document data stated in the link from the document data DB 8003.

S8: The transmitting/receiving unit 81 of the data server transmits the document data to the external input apparatus 40. In this way, the viewing unit 453 of the external input apparatus 40 displays the document data display screen shown in FIG. 24 on the display 508.

Sharing of Screen Displayed on Display 508

Figure 29:
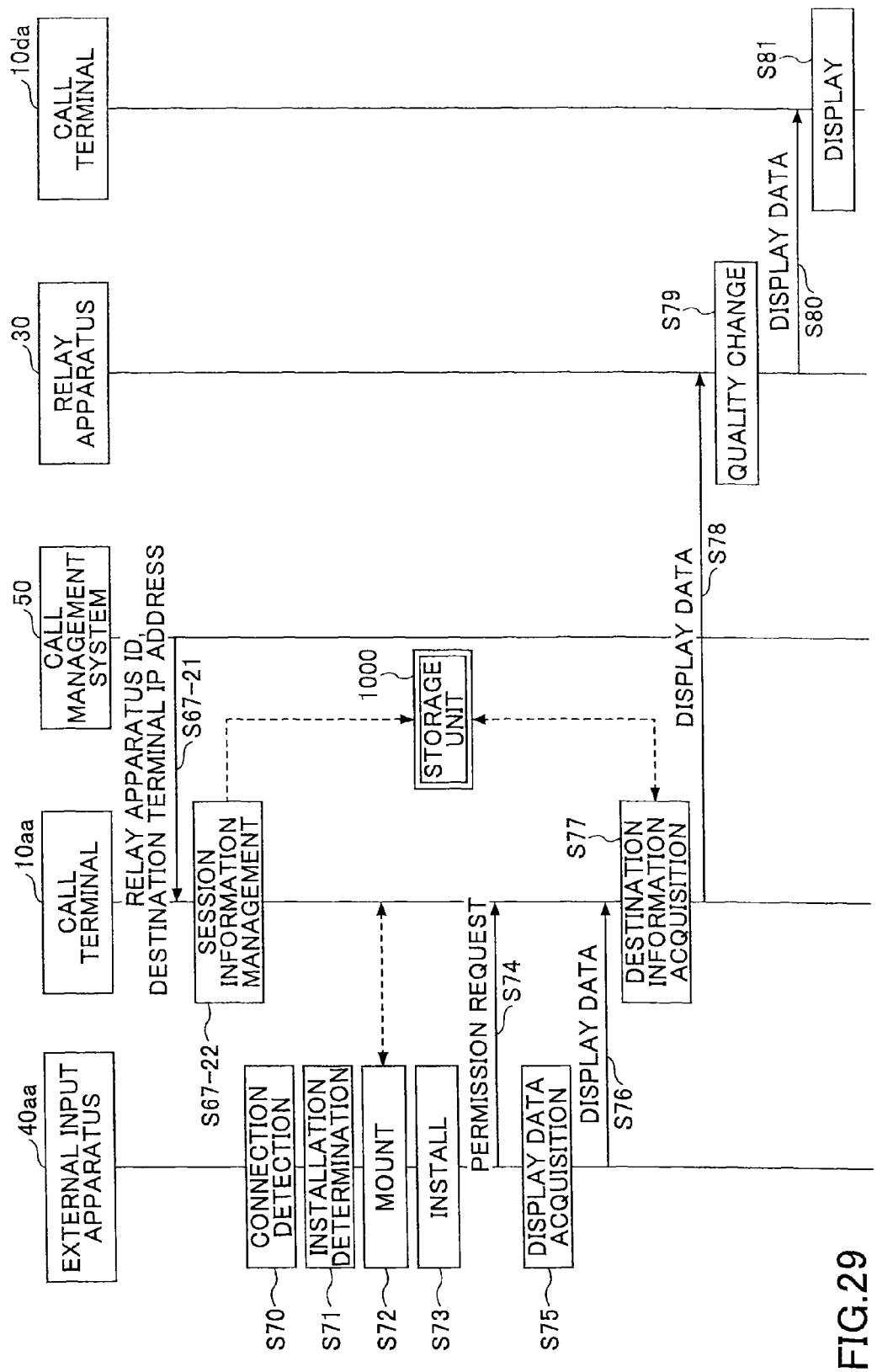
FIG. 29 is a sequence diagram illustrating one example of a process which causes display data displayed by the external input apparatus to be displayed on a call terminal which is a counterpart of a conference.

FIG. 29 is a sequence diagram illustrating one example of a process which causes display data displayed by the external input apparatus 40 to be displayed on the call terminal 10 which is a counterpart of a conference. A process which causes display data showing an image displayed on a display 508*aa* of the external input apparatus 40*aa* to be transmitted to a different call terminal 10*da* to be displayed on the display 120*da* is described with reference to FIG. 29.

As described above, when the relay apparatus 30 is determined, the IP address "1.3.2.4" of the destination terminal 10*da* and the relay apparatus ID "111a" transmitted by the transmission management system 50 in step S67-21 is received by the transmitting/receiving unit 11 of the call terminal 10*aa*. Then, the relay apparatus ID "111a" and the IP address "1.3.2.4" that are received are stored into the storage unit 1000 by the storage and reading processing unit 19 (step S67-22).

Moreover, when the external input apparatus 40*aa* is connected to the call terminal 10*aa*, the connection detection unit 42 of the external input apparatus 40*aa* detects the connection (step S70). When the external input apparatus

40aa is activated, the display control unit 47 displays the screen which includes the whole area. When the connection detection unit 42 detects the connection of the external input apparatus 40aa and the call terminal 10aa, the installation determination unit 43a determines whether programs for an external input apparatus are installed in the external input apparatus 40aa (step S71). If installed, it is determined that the external input apparatus 40aa includes functional units corresponding to the respective programs. The display data acquisition unit 451 and the display data transmission unit 452 are realized by the programs for the external input apparatus.

On the other hand, when it is determined by the installation determination unit 43a that the programs for the external input apparatus are not installed, the mount unit 48 has mounted the storage unit 1000 of the call terminal 10aa (step S72). Next, the program acquisition unit 43b acquires and installs the programs for the external input apparatus that are stored in the storage unit 1000 of the call terminal (step S73). This causes the external input apparatus 40aa to include the display data acquisition unit 451 and the display data transmission unit 452. The external input apparatus 40aa may include the display data acquisition program 1451 and the display data transmission program 1452 in advance.

When the process of step S73 is completed, the transmitting/receiving unit 41 transmits, to the call terminal 10aa, information for requesting permission to transmit display data (step S74). Then, when information indicating permission to the request from the call terminal 10aa is received by the transmitting/receiving unit 41, the display data acquisition unit 451 acquires display data showing an image displayed on the display 508 (step S75).

Next, the display data transmission unit 452 transmits display data to the external information transmitting/receiving unit 18 of the call terminal 10aa (step S76). At this stage, the resolution of the display data may be converted to the resolution appropriate for the display 120aa.

When the transmitting call terminal 10aa receives display data from the external input apparatus 40aa, the storage/reading processing unit 19 reads the IP address "1.3.2.3." of the call terminal 10da to be the destination and the relay apparatus ID "111a", which is stored in the storage unit 1000 (step S77). Then, the transmitting/receiving unit 11 transmits, to the relay apparatus 30 indicated by the relay apparatus ID "111a", which is read in step S74, the IP address "1.3.2.3" of the call terminal 10da to be the destination and the display data whose resolution is converted (step S78). When the relay apparatus 30 receives display data transmitted from the call terminal 10aa in step S78, it changes the image quality of the display data based on the IP address "1.3.2.3" of the destination call terminal 10da (step S79), and transmits the display data to the call terminal 10da (step S80). When the display data transmitted from the relay apparatus 30 is received by the transmitting/receiving unit 11 of the call terminal 10da, the image display control unit 14b causes image shown by the received display data to be displayed on the display 120 (step S81).

Figure 30:
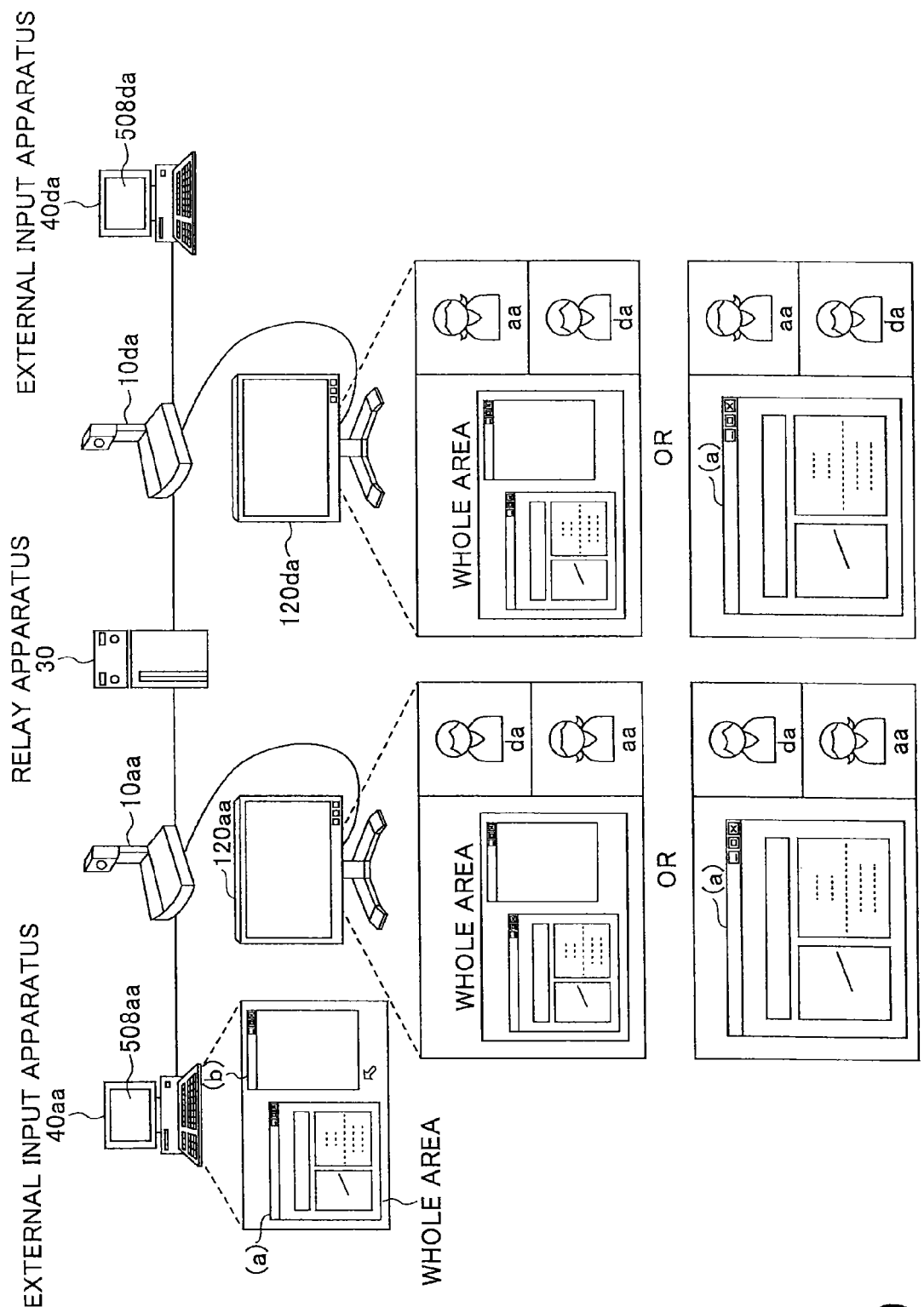
FIG. 30 is an exemplary diagram for explaining a screen displayed in displays 120aa, 120da, displays 508aa, 508da of external input apparatuses 40aa, 40da out of the overall configuration of the call system 1.

FIG. 30 is an exemplary diagram for explaining a screen displayed in displays 120aa, 120da, displays 508aa, 508da of external input apparatuses 40aa, 40da out of the overall configuration of the call system 1. A screen which the person in charge would like to share with the call terminal 10da is displayed on the display 508 of the external input apparatus 40aa. A screen which is displayed on the external input apparatuses 40aa and 40da is called a desktop screen. Moreover, a range used by each application within the desktop screen is called an area (called a window depending on the OS). On the desktop screen, with the whole screen being one area (below called the overall area to make the distinction), multiple areas may be displayed in the whole area (there may be a case in which not even one area is displayed). In FIG. 30, as one example, areas (a) and (b) are displayed.

In the process in FIG. 29, the call terminal 10aa displays image data and display data on the display 120aa, while the call terminal 10da displays image data and display data on the display 120da. Of the display screens of the displays 120aa and 120da in FIG. 30, the overall area as the display data and the user aa of the call terminal 10aa and the user da of the call terminal 10da as the image data are displayed on the display 120 on the upper row. An area (a) as the display data and the user aa of the call terminal 10aa and the user da of the call terminal 10da as the image data are displayed on the display 120 on the lower row.

Whether the whole area is shared or the area (a) (or the area (b)) is shared depends on which area is selected by the person in charge from the desktop screen. Details will be described below. The present Embodiment makes it possible for the user to select and share the whole area, or an arbitrary area (a) or (b).

Figures 31A, 31B:
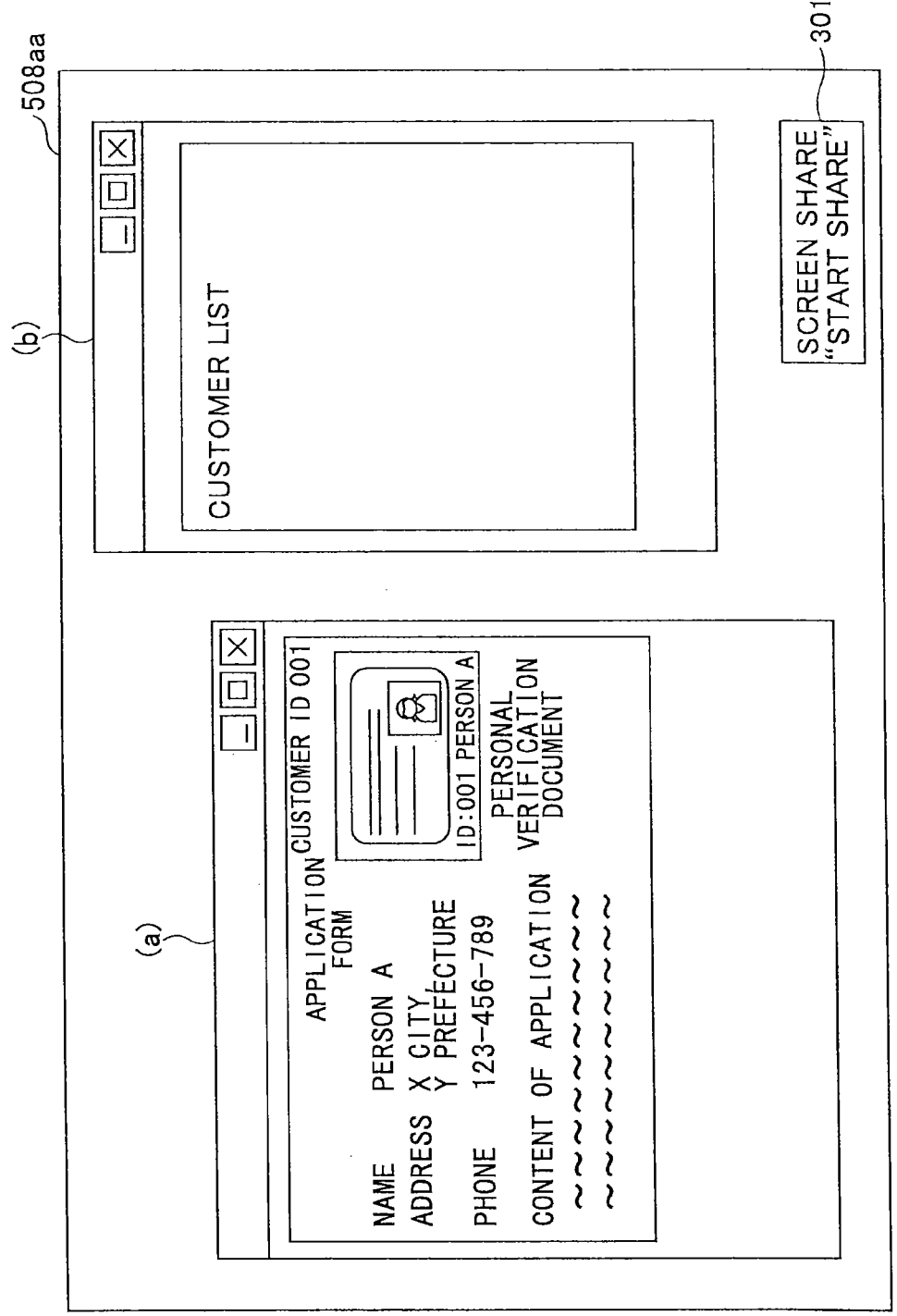
FIGS. 31A and 31B are exemplary diagrams illustrating an exemplary screen displayed on a display connected to the external input apparatus.

FIGS. 31A and 31B are exemplary diagrams illustrating an exemplary screen displayed on the display 508aa connected to the external input apparatus 40. As described in FIG. 28, the person in charge may display an area on a document data display screen. In FIG. 31A, the area (a) is the document data display screen. In the area (b), any data may be displayed. In FIG. 31A, the customer list is displayed. The person in charge may select an arbitrary area with a mouse pointer, a touch panel, etc. The selected area may be called an active area. The active area refers to an area to be input into or operated on by the user, and is called an active window in Windows (registered trademark), MAC OS, etc.

Programs for an external input apparatus are installed in the external input apparatus 40aa, so that normal operations, or the user performing a predetermined operation causes a screen share button 301 to be displayed on the lower right of the desktop screen, for example. The predetermined operation may be clicking or double clicking an icon for the program for the external input apparatus, hovering a mouse over the icon, etc.

As shown in FIG. 31, the person in charge may click the screen share button 301 to share a screen of the display 508 that is displayed by the external input apparatus 40aa with the call terminal 10da on the branch side via the call terminal 10aa.

More specifically, pressing the screen share button 301 is reported from the external input apparatus 40aa to the call terminal 10aa, and, moreover, the call terminal 10aa reports to the relay apparatus 30. The relay apparatus 30 transmits a delivery event to the call terminals 10aa and 10da to start sharing the display data. When the external input apparatus 40aa acquires a report that the delivery event is received from the call terminal 10aa, it changes the notation of the screen sharing button 301 as shown in FIG. 31B.

FIG. 31B illustrates an example of the screen share button 301 when the share is stopped. From this status, when the person in charge presses the screen share button 301 again, the relay apparatus 30 transmits the delivery event to the call terminals 10aa and 10da with the same procedure, so that sharing the display data is completed. When the external input apparatus 40aa acquires a report that the delivery event is received from the call terminal 10aa, it changes the notation of the screen sharing button 301 (returning to the status of FIG. 31A).

Selection of Area

An area according to the present Embodiment corresponds to one area displayed on a GUI-type user interface. The person in charge may select an arbitrary area, or select the whole area (Whether the whole area can be selected depends on the specification of the OS).

In order to select one area, the person in charge clicks the area portion with a pointing device. In order to select the whole area, the person in charge clicks a portion other than the desktop screen area with the pointing device. The OS detects the clicked location. The whole of the desktop screen is handled as one area (the whole area and an area are handled separately). When the user selects this whole area with the pointing device, the operation input acceptance unit 46 may detect selection of the whole area via an API and share the whole area as the display data.

The area selected by the person in charge is called an active area. The whole area cannot be the active area. Thus, if there is the active area, the display data acquisition unit acquires the display data for the active area, and, otherwise, the display data acquisition unit acquires the display data for the whole area. For determining whether there is the active area, an OS function is used, for example. For example, when Windows (registered trademark) API is used, a handle of the active area is acquired, and, if the value of the handle is not NULL, it is determined that there is an active area.

In this way, the call terminals 10aa and 10da may share the display data for the active area. However, in the present Embodiment, there are cases in which the display data on the head office side should not be shared with the customer on the branch side. For example, these include a personal verification certificate of a different customer, a customer ID table, personal information on a different customer, etc. Thus, in the present Embodiment, the display data acquisition unit shares only the customer information listing screen or the document data display screen. In other words, the area (a) in FIG. 31A is shared, and the area (a) is shared even if the whole area and the area (b) are active areas. In other words, when connected to the data server 80, the display data acquisition unit only acquires an area in which is displayed an HTML document transmitted from the data server 80.

Figure 32:
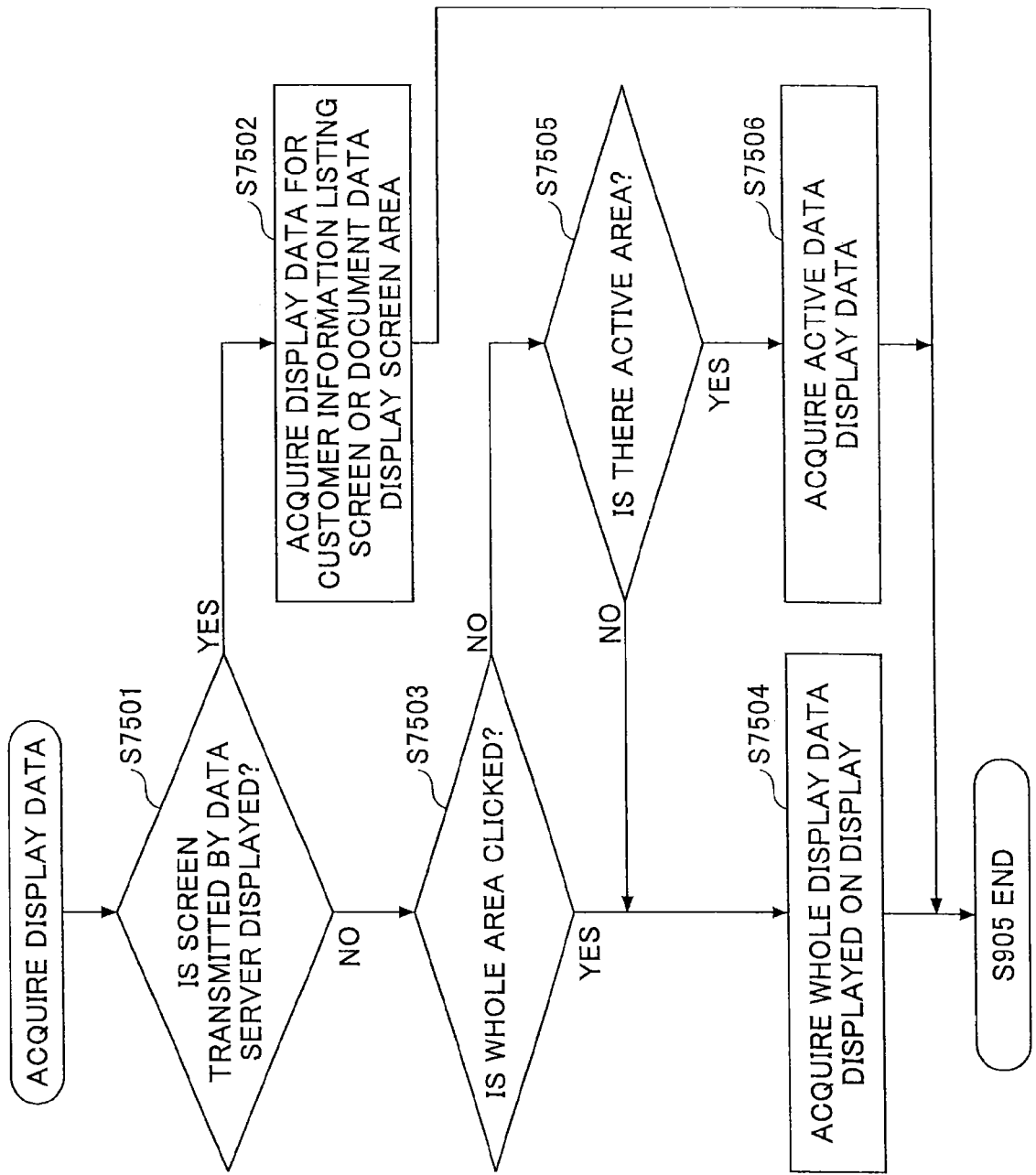
FIG. 32 is an exemplary flowchart indicating a procedure for a display data acquisition unit acquiring display data.

FIG. 32 is an exemplary flowchart indicating a procedure for a display data acquisition unit acquiring display data. The display data acquisition unit periodically repeats the process in FIG. 32.

First, the display data acquisition unit determines whether the screen transmitted by the data server 80 is displayed on the display 508 (S7501). For example, if a title of an area is a predetermined title (for example, a customer information listing screen, a document data display screen) upon inquiring a browser, it is determined to be the document data display screen. Moreover, if a URL of a server currently being accessed is a domain name which is projected to be the data server 80, it may be determined that the data server 80 is being accessed.

If the external input apparatus 40 displays a screen transmitted by the data server 80 (YES in S7501), the display data acquisition unit acquires the display data for an area of the customer information listing information screen or the document data display screen (S7502).

If the external input apparatus 40 is not accessing the data server 80 (No in S7501), the display data acquisition unit acquires the display data of the active area, so that whether selection of the whole area has been accepted or not is determined (S7503).

If the selection of the whole area is accepted (Yes in S7503), the display data acquisition unit 451 acquires the whole of the desktop screen displayed on the display 508, so that the process is completed (S7504).

If the selection of the whole area is not accepted (No in S7503), the display data acquisition unit 451 determines whether there is an active area (S7505).

If there is no active area, such as when the person in charge closes the active are (No in S7505), the process proceeds to step S7504, and acquires the whole of the desktop screen as the display data.

If there is the active area (Yes in S7505), the display data acquisition unit 451 acquires display data of an area being active, out of the display data which are displayed on the display 508 by the display control unit (S7506).

In this way, a screen shot, etc., may be checked together with the customer while preventing sharing of information not related to the customer displayed on the display 508 by the external input apparatus 40.

Figure 33:
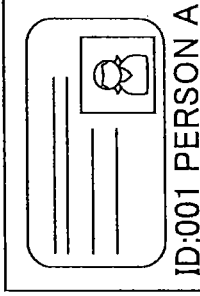
FIG. 33 is a diagram illustrating an exemplary screen displayed on the display by the call terminal.

FIG. 33 is a diagram illustrating one example of a screen which is displayed on the display 120aa by the call terminal 10aa. Almost the same screen is also displayed on the display 120da. The display data of the document data display screen displayed on the display 508 by the external input apparatus 40aa are displayed in an area A21; the image data of a customer that is transmitted by the counterpart terminal are displayed in an area A22; and the image data of a person in charge that are imaged by the own terminal are displayed in an area A23.

The call terminal 10da, which is the counterpart terminal, displays the display data of the document data display screen in the same multi-view mode, as a normal conference mode. Alternatively, the layout thereof may be forcefully set to be the same layout as that of the call terminal 10aa.

As described above, the call system 1 according to the present Embodiment makes it possible to display, on the display 508 in the external input apparatus 40, a personal verification certificate which is registered in the data server 80 using the call terminal 10aa. Moreover, only information relevant to the customer that is downloaded from the data serves 80 may be shared and displayed by the call terminals 10aa and 10da to converse between the person in charge and the customer.

Embodiment 3

In the present Embodiment, a call system 1 which prints a document data display screen from the printing terminal 20 on the customer side is described.

Figure 34:
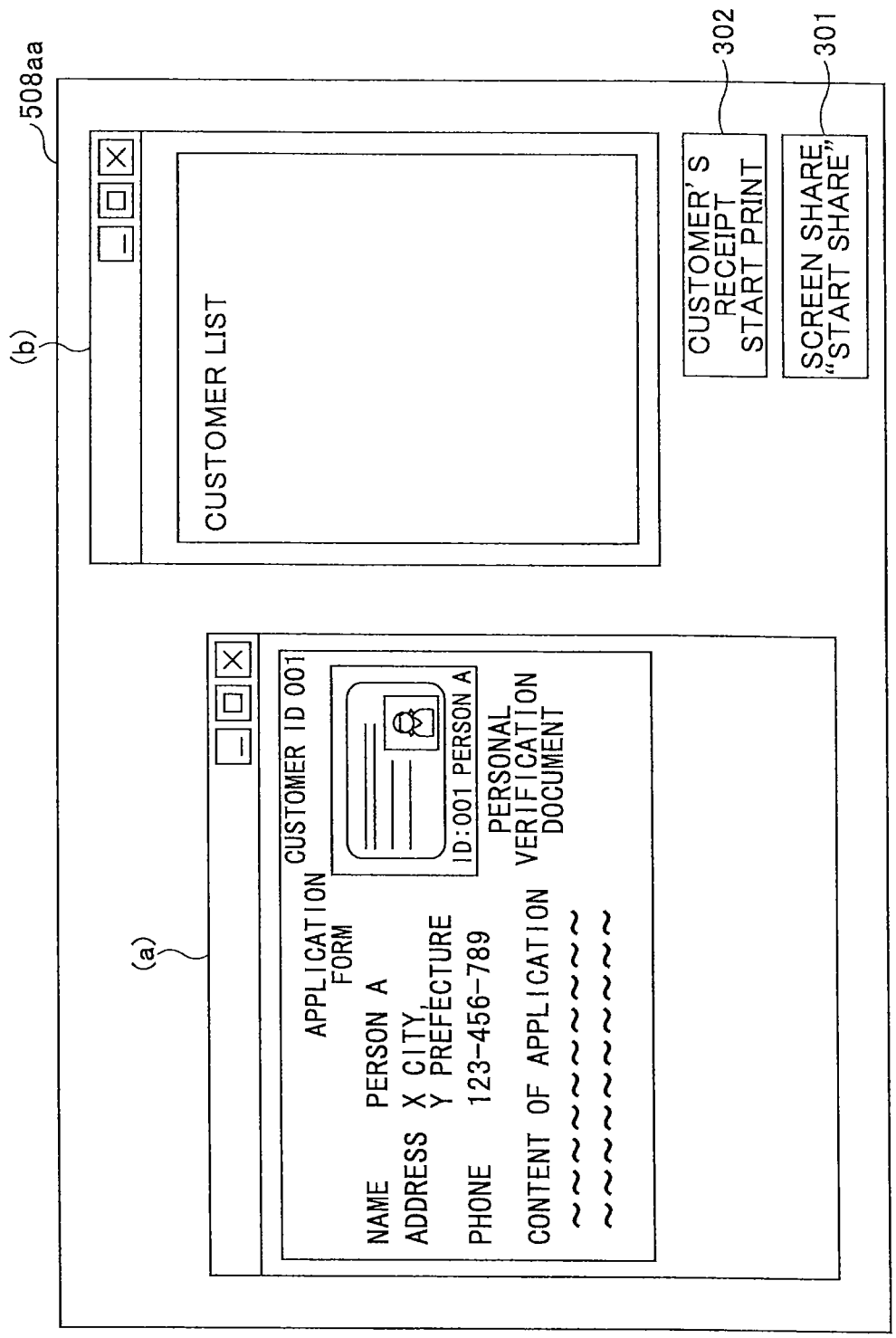
FIG. 34 is a diagram illustrating a desktop screen displayed on the display of the call terminal.

FIG. 34 illustrates an exemplary desktop screen displayed on the display 508 connected to the external input apparatus 40aa. The screen creation unit 83 of the data server 80 provides a description to open a new area (window) with JavaScript, for example, in an HTML document of the document data display screen, while the viewing unit 453 provides a popup-type display of a customer's receipt print button 302 on the display 508. Alternatively, a link which accepts that sharing on the document data display screen has been started may be displayed, and the popup-type display of the customer's receipt print button 302 may be provided when the link is pressed.

For example, the following description is added to an HTML document of the document data display screen: <ahref="javascript:void(window.open(' . . . /client/ print/customer's receipt printing.html', 'null', 'width=200, height=150, menubar=no, toolbar=no, scrollbars=no'));">start share</a> In this way, a character sequence "start share" is displayed on the document data display screen. When the person in charge clicks "start share", " . . . /client/print/print customer's receipt.html" is requested from the data server, and the viewing unit 453 provides a popup-type display of "customer's receipt print.html". The following HTML document is described in the "customer's receipt print.html": <form action=" . . . /client/cgi-bin/abc.cgi" method="post"><input type="hidden" name="document" value=" . . . /client/data/12345/001.htm"><input type="submit" value="start printing customer's receipt">

When the customer's receipt print button 302 is selected, the operation input acceptance unit 46 accepts an operation of transmitting a print event to the data server 80. More specifically, as the print event, "document" and " . . . /client/data/12345/001.htm" are transmitted to the data server.

When pressing the customer's receipt print button 302 is accepted by the operation input acceptance unit 46 of the external input apparatus 40, the transmitting/receiving unit 41b transmits the print event to the data server 80.

Instead of the popup-type display, the customer' receipt print button 302 may be provided within the document data display screen.

Figure 35:
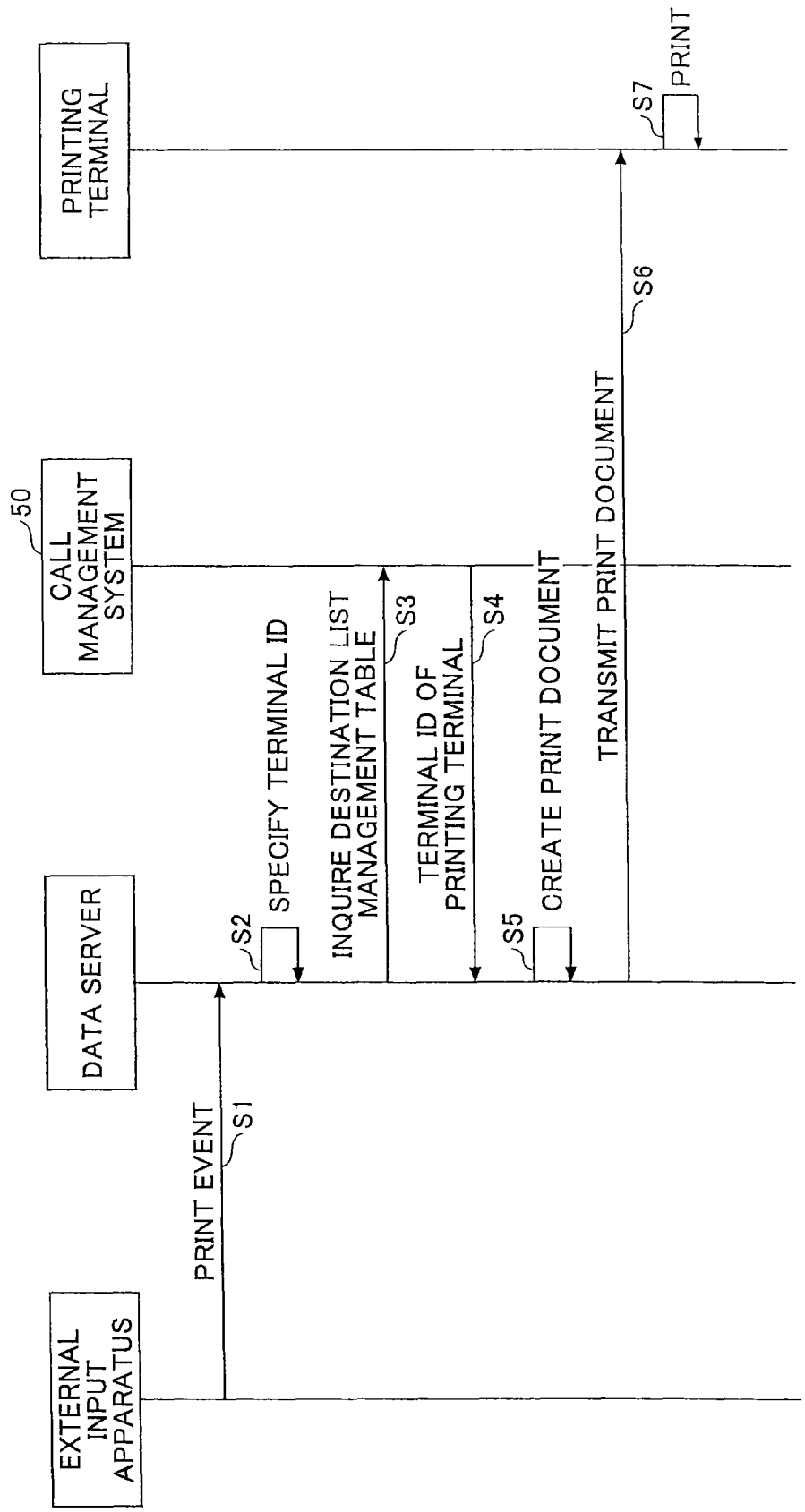
FIG. 35 is an exemplary sequence diagram indicating a procedure up to the person in charge printing document data.

FIG. 35 is an exemplary sequence diagram indicating a procedure up to the person in charge printing document data.

S1: When the person in charge presses the customer's receipt printing button, the data server 80 receives a print event.

S2: The print control unit 84 of the data server 80 specifies two terminal IDs using " . . . /client/data/12345/001.htm", which was received as the print event. In other words, a URL of a screen shot described in an img tag of document data (001.htm file) is read, and, if it is a URL "root/client/photoshot/data/01aa/001_01da_xxx.jpg", it is specified that the terminal ID of the call terminal 10aa on the head office side is "01aa" and that the terminal ID of the call terminal 10ab on the branch side is "01da".

S3: With the call terminal 10aa on the head office side as a requestor and the call terminal 10ab on the branch side as a destination terminal, the print control unit 84 inquires the call management system on the destination terminal ID of the printing terminal 20.

S4: In the destination list management table, the call management system specifies the printing terminal 20 installed on the branch side and transmits the IP address and the terminal ID of the printing terminal 20 to the data server 80. In other words, in the destination list management table, the printing terminal 20 which is registered as the destination terminal of records with the call terminal 10aa as the requestor and the call terminal 10da on the branch side is specified. The external input apparatus 40 may request the destination list information 1003 from the call terminal 10aa and the printing terminal 20 included in the destination list information may be reported to the data server 80.

S5: The print control unit 84 rasterizes a html file (001.htm) of the document data display screen in the same manner as a browser to convert the rasterized results into a format (for example, PDL data) which is printable by the printing terminal 20. At this time, a description such as "customer's receipt" may be added on the upper portion of the print data, for example.

S6: The data server 80 transmits a print document to the printing terminal 20.

S7: The printing terminal 20 prints the document data display screen.

In this way, the external input apparatus 40 may print the document data display screen in the printing terminal 20 of the branch at which the customer is located. The person in charge does not have to go to the customer side (branch) or send by post when passing on the receipt, so that convenience is improved.

When the printing terminal 20 is arranged within a firewall, the data server 80 cannot be accessed from outside, so that a session may be established in advance between the call management system or the data server 80 and the printing terminal 20. Moreover, the printing terminal 20 may periodically inquire the presence/absence of printing to the data server 80, which may transmit a print document as a response to an inquiry.

According to a further Embodiment of the present invention, a communication system is provided, including, a program which causes an information processing apparatus, the information processing apparatus being communicatively connected via a communication network to a communication terminal which communicates with a different terminal via the communication network and being accessible to an image data storage unit which stores image data of a document including personal verification information linked to owner identification information of an owner of the document that includes the personal verification information, the personal verification information being imaged by the different communication terminal; and a document data storage unit which stores document data linked to the owner identification information of the owner, to execute the steps of: receiving, via the communication terminal, the image data of the document including the personal verification information imaged by the different communication terminal with the owner identification information of the owner; receiving a transmission request from the communication terminal; and, when the transmission request is received in the receiving step, transmitting, to the communication terminal, screen data in which are associated identification information of the image data when the owner identification information linked to the document data stored in the document data storage unit is linked to the image data stored in the image data storage unit and information indicating non-registration when the owner identification information linked to the document data stored in the document data storage unit is not linked to the image data stored in the image data storage unit with identification information of the document data which are stored in the document data storage unit.

The present invention can be implemented in any convenient form, for example using dedicated hardware, or a mixture of dedicated hardware and software. The present invention may be implemented as computer software implemented by one or more networked processing apparatuses. The network can comprise any conventional terrestrial or wireless communications network, such as the Internet. The processing apparatuses can compromise any suitably programmed apparatuses such as a general purpose computer, a personal digital assistant, a mobile telephone (such as a WAP or 3G-compliant phone) and so on. Since the present invention can be implemented as software, each and every aspect of the present invention thus encompasses computer software implementable on a programmable device. The computer software can be provided to the programmable device using any storage medium for storing processor readable code such as a floppy disk, a hard disk, a CD ROM, a magnetic tape device or a solid state memory device. The hardware platform includes any desired kind of hardware resources including, for example, a central processing unit (CPU), a random access memory (RAM), and a hard disk drive (HDD). The CPU may be implemented by any desired kind of any desired number of processors. The RAM may be implemented by any desired kind of volatile or non-volatile memory. The HDD may be implemented by any desired kind of non-volatile memory capable of storing a large amount of data. The hardware resources may additionally include an input device, an output device, or a network device, depending on the type of the apparatus. Alternatively, the HDD may be provided outside of the apparatus as long as the HDD is accessible. In this example, the CPU, such as a cache memory of the CPU, and the RAM may function as a physical memory or a primary memory of the apparatus, while the HDD may function as a secondary memory of the apparatus.

The present application is based on and claims the benefit of priority of Japanese Priority Application No. 2013-138307 filed on Jul. 1, 2013, the entire contents of which is hereby incorporated by reference.

The invention claimed is:

1. An information processing apparatus which is communicatively connected via a communication network to a communication terminal which communicates with a different communication terminal via the communication network, and which is accessible to
    an image data storage which stores image data of a document including personal verification information linked to owner identification information of an owner of the document including the personal verification information, the document including personal verification information being imaged by the different communication terminal; and
    a document data storage which stores document data linked to the owner identification information of the owner, the information processing apparatus including:
    circuitry configured to:
    receive a transmission request from the communication terminal; and
    when the transmission request is received, transmit, to the communication terminal, screen data in which
        identification information of the image data is associated with identification information of the document data stored in the document data storage when the owner identification information linked to the document data stored in the document data storage is linked to the image data stored in the image data storage, and
        information indicating non-registration is associated with the identification information of the document data stored in the document data storage when the owner identification information linked to the document data stored in the document data storage is not linked to the image data stored in the image data storage.

2. The information processing apparatus as claimed in claim 1, wherein the circuitry is configured to:
    when the transmission request is received, create the screen data in which
        the identification information of the image data is associated with the identification information of the document data stored in the document data storage when the owner identification information linked to the document data stored in the document data storage is linked to the image data stored in the image data storage, and
        the information indicating the non-registration is associated with the identification information of the document data stored in the document data storage when the owner identification information linked to the document data stored in the document storage is not linked to the image data stored in the image data storage.

3. The information processing apparatus as claimed in claim 2, wherein,
    when associating the identification information of the image data with the identification information of the document data in the screen data, the circuitry is configured to add to the identification information of the document data first access information to the document data,
    when the circuitry receives a transmission request for the document data based on a selection of the first access information from the communication terminal, the circuitry is configured to read, from the document data storage, data which describes second access information for accessing the image data linked to the owner identification information and the owner identification information linked to the document data accessed with the first access information, and
    transmit the data which describes the second access information to the communication terminal.

4. The information processing apparatus as claimed in claim 3, wherein
    the information processing apparatus is communicatively connected via the communication network to a second information processing apparatus which is communicatively connected to the communication terminal,
    the circuitry is configured to add, to the document data, a description which displays a print button for accepting printing of the document data, and
    when a print request based on pressing of the print button is received from the second information processing apparatus, a destination information storage in which a printing terminal and the different communication terminal are registered as a destination of the communication terminal is accessed to acquire address information of the printing terminal and request printing of the document data by the printing terminal.

5. The information processing apparatus as claimed in claim 2, wherein
    the document data linked to the owner identification information is stored in the document data storage for each person in charge identification information of a person in charge having a privilege to access the document data of the owner,
    the circuitry is configured to receive the person in charge identification information in addition to the transmission request for the screen data, and
    the circuitry is configured to determine whether the owner identification information linked to the document data is linked to the image data stored in the image data storage for the document data stored in the document data storage that are specified in the person in charge identification information to create the screen data.

6. A second information processing apparatus which is communicatively connected via the communication network to the information processing apparatus as claimed in claim 3 and which is communicatively connected to the communication terminal, comprising:
other circuitry configured to:
request, from the information processing apparatus, transmission of the screen data to display requested results on a first display apparatus connected to the second information processing apparatus and accept the selection of the first access information to the document data included in the screen data to request, from the information processing apparatus, the document data and display the document data received from the information processing apparatus on the first display apparatus;
capture display content at least including the document data which are displayed on the first display apparatus to create display data; and
transmit the display data to the communication terminal and the different communication terminal which is connected via the communication network to the communication terminal.

7. The second information processing apparatus as claimed in claim 6, wherein
when an area created by an application program executed by the second information processing apparatus and an area in which the circuitry displays the document data are displayed on the first display apparatus, the circuitry is configured to create the display data only from the area in which the document data are displayed.

8. A communication terminal which is communicatively connected via the communication network to the information processing apparatus as claimed in claim 6, comprising:
other circuitry configured to:
acquire the owner identification information of the owner; and
display, on a second display apparatus, the image data including the document including personal verification information imaged by the different communication terminal; and
another image data storage which stores the image data when information which indicates a permission to store is received from the different communication terminal, wherein the other circuitry is configured to
transmit the image data stored by the another image data storage to the information processing apparatus, the image data being linked with the acquired owner identification information.

9. The communication terminal as claimed in claim 8, wherein the other circuitry is configured to:
receive the display data from the second information processing apparatus, the second information processing apparatus being communicatively connected to the communication terminal,
transmit the display data to the different communication terminal via the communication network, and
display, on the second display apparatus, imaged image data which are imaged by the communication terminal and imaged image data which are imaged by the different communication terminal and transmitted, and the display data.

10. A communication system which includes a communication terminal and a different communication terminal that are communicatively connected via a communication network, and an information processing apparatus which is communicatively connected to the communication terminal, the communication system comprising:
circuitry configured to:
receive image data of a document including personal verification information which is imaged by the different communication terminal with owner identification information of an owner of the document including the personal verification information via the communication terminal;
an image data storage which stores the image data linked to the owner identification information of the owner; and
a document data storage which stores document data linked to the owner identification information of the owner, wherein the circuitry is configured to:
receive a transmission request from the communication terminal,
when the transmission request is received, transmit, to the communication terminal, screen data in which
identification information of the image data is associated with identification information of the document data stored in the document data storage when the owner identification information linked to the document data stored in the document data storage is linked to the image data stored in the image data storage, and
information indicating non-registration is associated with the identification information of the document data stored in the document data storage when the owner identification information linked to the document data stored in the document data storage is not linked to the image data stored in the image data storage,
receive the screen data, and
display the screen data on a first display apparatus.

11. An information processing method in an information processing apparatus which is communicatively connected via a communication network to a communication terminal which communicates with a different communication terminal via the communication network, and which is accessible to
an image data storage which stores image data of a document including personal verification information linked to owner identification information of an owner of the document including the personal verification information, the document including personal verification information being imaged by the different communication terminal; and
a document data storage which stores document data linked to the owner identification information of the owner, the information processing method comprising the steps of:
receiving a transmission request from the communication terminal; and
when the transmission request is received, transmitting, to the communication terminal, screen data in which
identification information of the image data is associated with identification information of the document data stored in the document data storage when owner identification information linked to the document data stored in the document data storage is linked to the image data stored in the image data storage, and information indicating non-registration is associated with the identification information of the document data stored in the document data storage when the owner identification information linked to the document data stored in the document data storage is not linked to the image data stored in the image data storage.

* * * * *